US010645344B2

(12) United States Patent
Marman et al.

(10) Patent No.: US 10,645,344 B2
(45) Date of Patent: May 5, 2020

(54) VIDEO SYSTEM WITH INTELLIGENT VISUAL DISPLAY

(75) Inventors: Douglas H. Marman, Ridgefield, WA (US); Mahesh Saptharishi, Waltham, MA (US); Levi Glozman, Acton, MA (US); Michael Ushomirsky, Needham, MA (US)

(73) Assignee: AVIGILON ANALYTICS CORPORATION, Vancouver (CA)

( * ) Notice: Subject to any disclaimer, the term of this patent is extended or adjusted under 35 U.S.C. 154(b) by 1048 days.

(21) Appl. No.: 12/879,952

(22) Filed: Sep. 10, 2010

(65) Prior Publication Data
US 2012/0062732 A1    Mar. 15, 2012

(51) Int. Cl.
*H04N 7/18* (2006.01)
*G08B 13/196* (2006.01)
*G06T 7/277* (2017.01)
*G06T 7/246* (2017.01)

(52) U.S. Cl.
CPC ............. *H04N 7/18* (2013.01); *G06T 7/246* (2017.01); *G06T 7/277* (2017.01); *G08B 13/19608* (2013.01); *G08B 13/19671* (2013.01); *G08B 13/19682* (2013.01); *G06T 2207/10016* (2013.01); *G06T 2207/30232* (2013.01)

(58) Field of Classification Search
USPC ........................................................ 348/143
See application file for complete search history.

(56) References Cited

U.S. PATENT DOCUMENTS

| | | | | |
|---|---|---|---|---|
| 7,565,139 | B2* | 7/2009 | Neven, Sr. ............. | G06K 9/228 455/3.01 |
| 7,623,677 | B2* | 11/2009 | Girgensohn ...... | G06F 17/30811 348/135 |
| 7,627,171 | B2 | 12/2009 | Hampshire, II et al. | |
| 8,174,572 | B2* | 5/2012 | Buehler et al. ............... | 348/143 |
| 8,254,626 | B2* | 8/2012 | Takamori ................ | G06T 7/246 345/629 |
| 2004/0160635 | A1* | 8/2004 | Ikeda .................... | G01S 3/7864 358/1.15 |
| 2006/0197839 | A1* | 9/2006 | Senior et al. ................. | 348/169 |

(Continued)

OTHER PUBLICATIONS

BriefCam Ltd., "BriefCam VS Online" http://briefcam.com/products/briefcam-vs-online, 4 pp., © 2010.

(Continued)

*Primary Examiner* — Stuart D Bennett
(74) *Attorney, Agent, or Firm* — BakerHostetler

(57) ABSTRACT

A video system for intelligent visual display includes a video camera having an imager that produces a first set of image data representing an image of a scene. Video analytics receive and analyze the first set of image data to track an object. The video analytics generate metadata synchronized to the first set of image data and representing location information of an image of the object in the image of the scene. A display management module receives the first set of image data and the metadata and uses the metadata to derive from the first set of image data a second set of image data representing a cropped close-up image of the object. The second set of image data is distinct from the first set of image data to enable separate display presentation of the cropped close-up image and the image of the scene.

48 Claims, 11 Drawing Sheets

(56) References Cited

U.S. PATENT DOCUMENTS

| | | | |
|---|---|---|---|
| 2006/0209087 A1* | 9/2006 | Takeshima | G06T 13/80 345/629 |
| 2007/0035623 A1* | 2/2007 | Garoutte et al. | 348/143 |
| 2007/0103577 A1* | 5/2007 | Misawa | H04N 5/2253 348/333.01 |
| 2007/0257985 A1* | 11/2007 | Estevez et al. | 348/143 |
| 2008/0129844 A1* | 6/2008 | Cusack | H04N 5/232 348/241 |
| 2008/0192129 A1* | 8/2008 | Walker | G11B 27/034 348/231.2 |
| 2008/0297599 A1* | 12/2008 | Donovan et al. | 348/143 |
| 2009/0015671 A1* | 1/2009 | Addy | 348/143 |
| 2009/0219300 A1 | 9/2009 | Peleg et al. | |
| 2009/0219387 A1 | 9/2009 | Marman et al. | |
| 2009/0219411 A1 | 9/2009 | Marman et al. | |
| 2009/0219639 A1 | 9/2009 | Marman et al. | |
| 2009/0244291 A1 | 10/2009 | Saptharishi et al. | |
| 2009/0245573 A1 | 10/2009 | Saptharishi et al. | |
| 2009/0256908 A1* | 10/2009 | Chen et al. | 348/143 |
| 2009/0310823 A1* | 12/2009 | Cherng | G06K 9/4642 382/103 |
| 2010/0011297 A1* | 1/2010 | Tsai | G06F 16/739 715/721 |
| 2010/0026802 A1* | 2/2010 | Titus | G08B 13/19608 348/143 |
| 2011/0013836 A1* | 1/2011 | Gefen | G06T 7/292 382/171 |
| 2012/0005047 A1* | 1/2012 | Hughes | G06Q 10/10 705/27.2 |

OTHER PUBLICATIONS

Ioimage intelligent video appliances, "ioi cammmp 100dn," http://www.ioimage.com/?p=ProductDetails&ClusterID=810&ParentID=624&FatherID=7 . . . , 9 pp., accessed Jun. 11, 2010.

\* cited by examiner

VIDEO SYSTEM WITH INTELLIGENT VISUAL DISPLAY

TECHNICAL FIELD

The present disclosure relates to video systems and more particularly to video analytics and video signal processing for use in video surveillance systems.

BACKGROUND INFORMATION

Automated security and surveillance systems typically employ video cameras or other image capturing devices or sensors to collect image data. In the simplest systems, images represented by the image data are displayed for contemporaneous screening by security personnel or recorded for later reference after a security breach. In those systems, the task of detecting objects of interest is performed by a human observer. A significant advance occurs when the system itself is able to perform object detection and tracking, either partly or completely.

In a typical surveillance system, for example, one may be interested in tracking a detected object such as a human, a vehicle, or an animal that moves through the environment. Some existing systems include video analytics to automatically track moving objects. These systems typically provide on a display screen a colored outline box surrounding an image of a detected object. Some systems also include pan, tilt, zoom (PTZ) cameras that automatically zoom in on and follow a detected object as it moves through the camera's field of view. Some PTZ cameras use mechanically driven optics to zoom in on objects. These PTZ cameras, however, output standard resolution video (e.g., D1 resolution). The moving parts of PTZ cameras with mechanically driven optics tend to create significant failure and maintenance problems. The use of mechanically driven optics also results in a loss of a full view of a scene once the camera has zoomed in on an object. As a result, some systems include one camera to continuously capture the full view of a scene and a second camera to zoom in on detected objects. Two camera systems for one field of view are relatively expensive and difficult to install. For example, a two camera system requires complex set-up to calibrate X-Y coordinate locations from the fixed view camera to correctly drive the PTZ camera to zoom in on a desired location. Other PTZ cameras employ digital PTZ to zoom in on detected objects. However, the present inventors have recognized a number of drawbacks of conventional digital PTZ cameras.

SUMMARY OF THE DISCLOSURE

In a preferred embodiment, a video system for intelligent visual display of an object of interest includes a video camera having an imager. The imager produces a first set of image data representing an image of a scene within a field of view of the video camera. The video system also includes video analytics receiving and analyzing the first set of image data to track an object of interest present in the scene. The video analytics generate metadata representing location information corresponding to a location of an image of the object of interest in the image of the scene. The metadata are synchronized to the first set of image data. The video system also includes a display management module receiving the first set of image data and the metadata. The display management module uses the metadata to derive from the first set of image data a second set of image data representing a cropped close-up image of the object of interest. The second set of image data is distinct from the first set of image data to enable separate display presentation of the cropped close-up image of the object of interest and the image of the scene.

Additional aspects and advantages will be apparent from the following detailed description of preferred embodiments, which proceeds with reference to the accompanying drawings.

DETAILED DESCRIPTION OF PREFERRED EMBODIMENTS

I. System Overview

Figure 1:
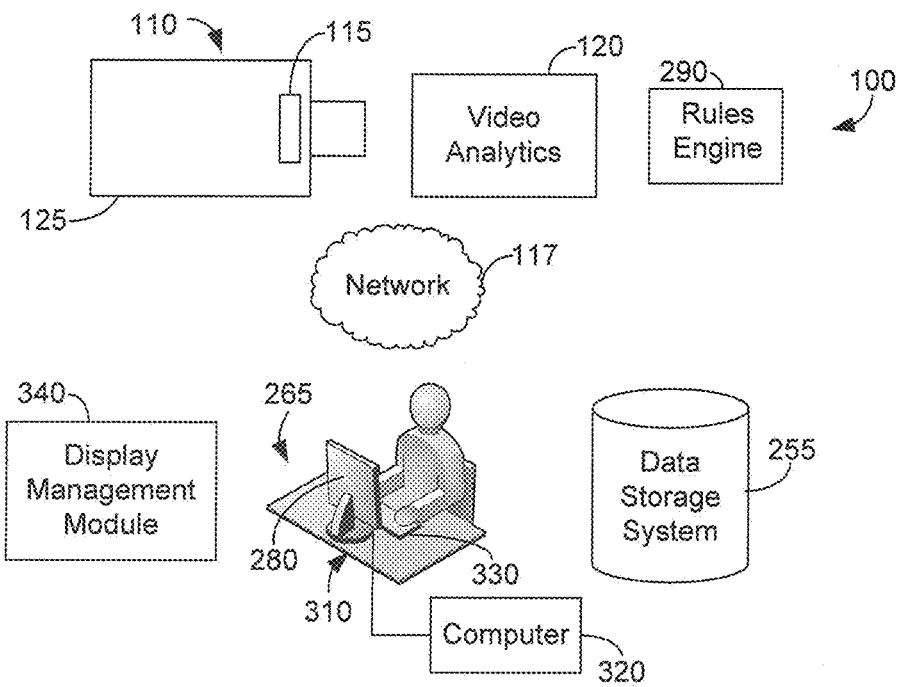
FIG. 1 is a pictorial diagram of a camera system according to one embodiment.

FIG. 1 is a pictorial diagram of the major components of a camera system 100 according to one embodiment. System 100 includes a video camera 110 and various components for processing image data produced by camera 110. Camera 110 may be any type of video camera. In one example, camera 110 is a network connected camera that is connected to other components of system 100 including other video cameras, if any. Preferably, camera 110 is a megapixel video camera including a high resolution megapixel imager 115 implemented with an advanced pixel architecture for capturing images of a field of view of camera 110. A preferred embodiment of camera 110 accommodates the use of one or more light-sensitive fixed focal length lenses. A fixed focal length, low f-stop lens improves the low-light performance of imager 115. In one example, the video camera described in commonly owned U.S. Patent Application Publication No. 2009/0219387, titled "Intelligent High Resolution Video System," may be used as camera 110. System 100 may include multiple video cameras 110 connected to one another and to the other components of system 100 over a network 117 (e.g., local area network, wide area network, wired network, wireless network, the Internet). Camera 110 includes a communication interface for communicating various forms of information (e.g., image data, metadata) through network 117.

Imager 115 of camera 110 captures multiple images (e.g., video frames) of the field of view and produces a first set of image data representing the images of the field of view. In a preferred embodiment, the first set of image data represents full resolution images corresponding to the resolution (e.g., megapixel resolution) of imager 115. In one example, camera 110 is used for video surveillance and captures images of a desired scene to detect whether an object of interest (e.g., a human, a vehicle, an animal) is viewable in the scene. Preferably, the images captured by imager 115 are full field of view images corresponding to zoomed-out views. Preferably, the first set of image data produced by imager 115 correspond to mega-pixel resolution information.

Figure 4:
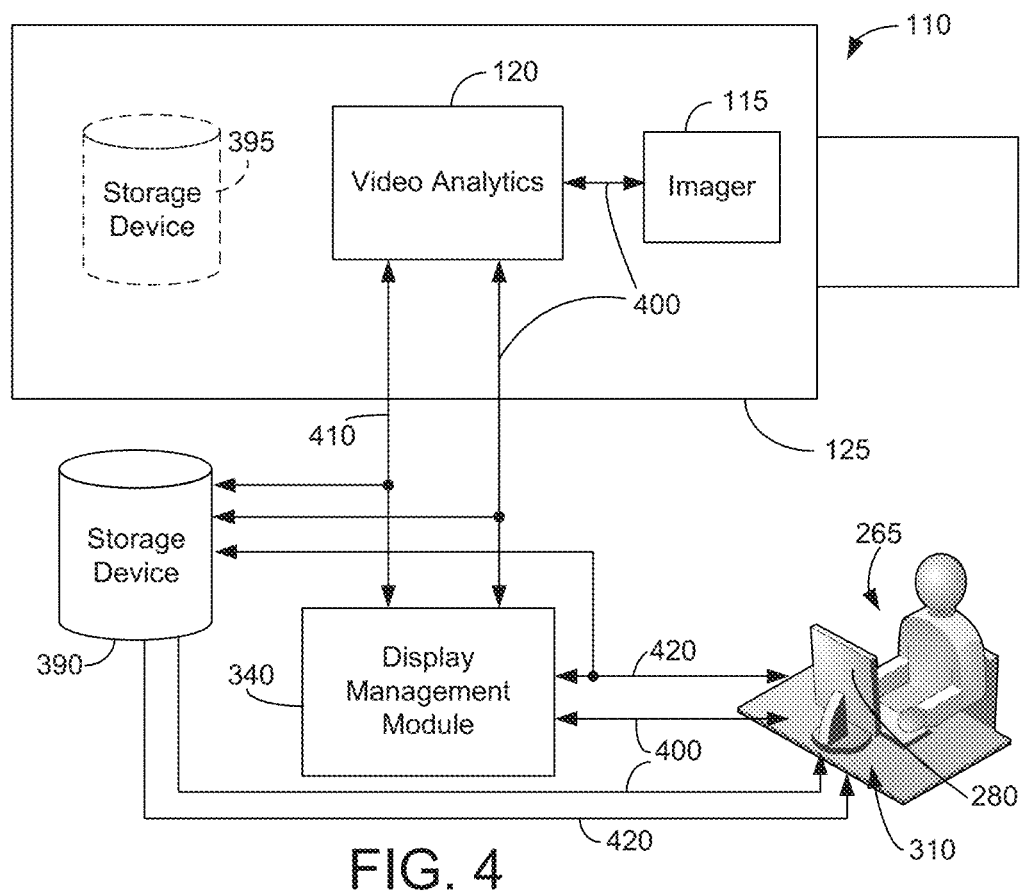
FIGS. 4-6 are pictorial block diagrams of various configurations of components of the camera system of FIG. 1.
Figure 5:
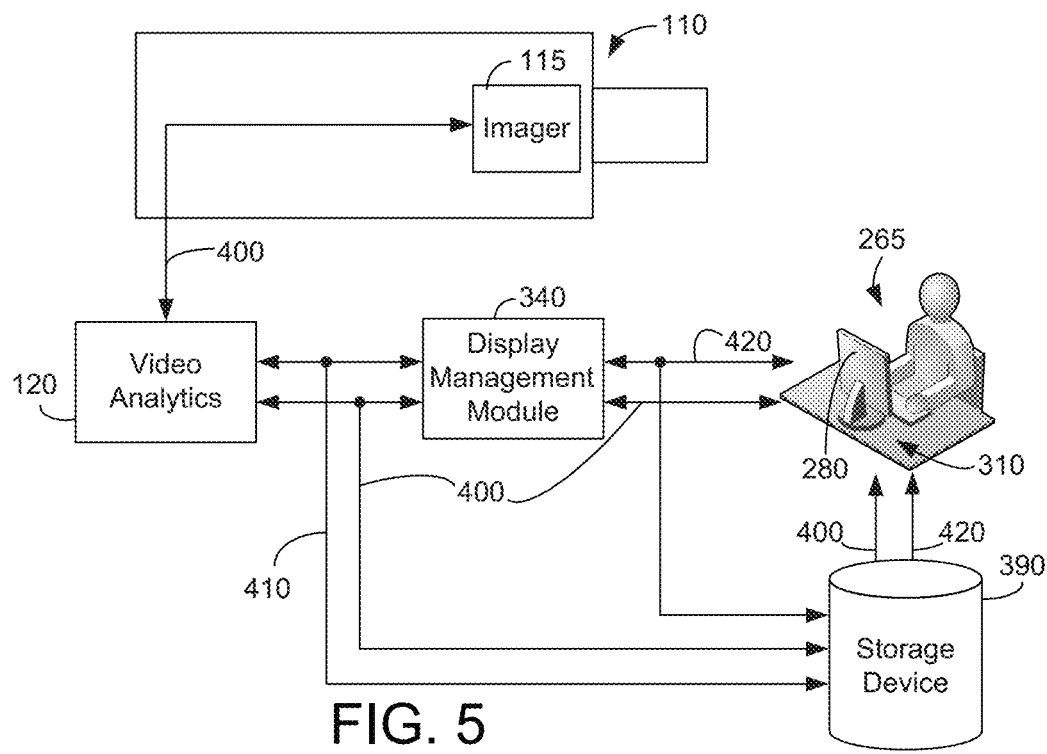
Figure 6:
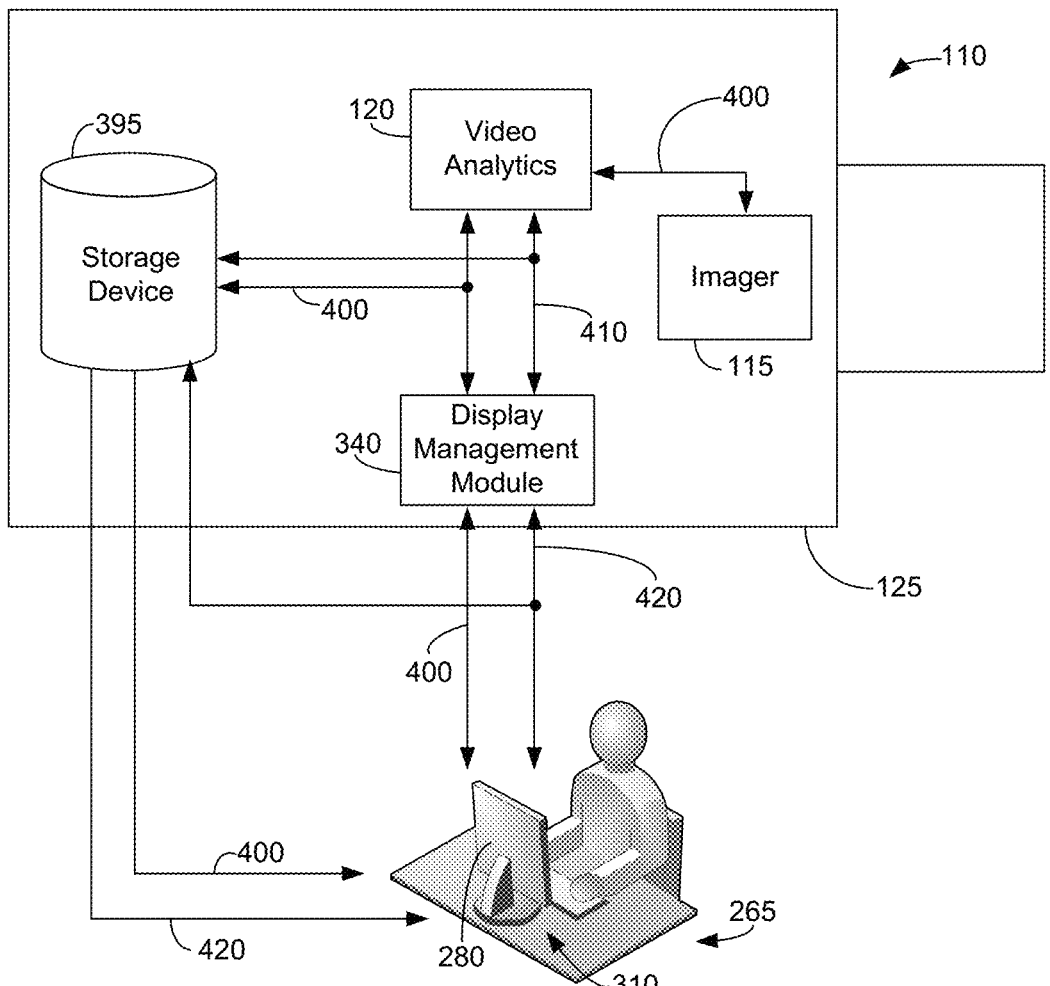

The first set of image data is communicated to video analytics 120 that are connected to imager 115. As used herein, the term "connected" means logically or physically connected directly or indirectly through one or more intermediaries. The first set of image data may be communicated directly from imager 115 to video analytics 120 or from imager 115 to a video buffer memory (not shown), then from video buffer memory to video analytics 120. Video analytics 120 may be implemented in software and reside on a processor or may be implemented in hardware in a specialized video processor. In one example, video analytics 120 reside on a processor contained in or forming a part of a housing 125 of camera 110 as shown in FIGS. 4 and 6. In another example, video analytics 120 reside on a processor remote from camera 110 (e.g., in a remote server or in a user station) as shown in FIG. 5, and the first set of image data produced by imager 115 are communicated to video analytics 120 over network 117. In a preferred embodiment, the first set of image data supplied to video analytics 120 include continuous high quality, high resolution (e.g., megapixel resolution), and high frame rate video information. In one example, the frame rate of the first set of image data corresponds to about 10 frames per second or more to ensure good quality video analysis and object tracking.

Video analytics 120 use the first set of image data to carry out various functions such as, but not limited to, object detection, classification, tracking, indexing, and search. To perform these various functions, video analytics 120 include a number of engines or modules that enable detection, classification, and tracking of objects present in the scene based on analysis of first set of the image data. As used herein, the term "module" is a component that may comprise one or more hardware circuits or devices or one or more software routines, functions, or objects. A module may also be entirely hardware, entirely software, comprise firmware, or comprise some combination of the foregoing.

Figure 2:
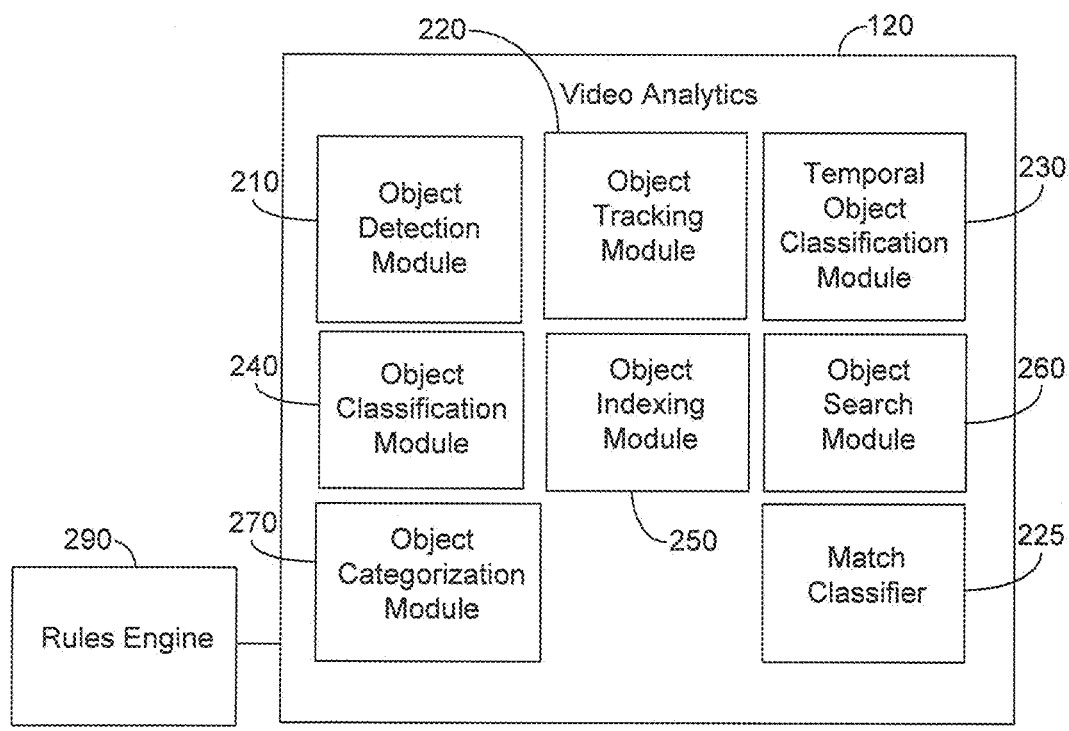
FIG. 2 is a block diagram of video analytics of the camera system of FIG. 1.

FIG. 2 is a simplified block diagram showing various processing modules that may be included in video analytics 120. Although video analytics 120 preferably includes the various modules shown in FIG. 2, video analytics 120 need not include all of these modules and may contain others in addition to those shown. The preferred embodiment of video analytics 120 is described in detail in commonly owned U.S. Patent Application Publication No. 2009/0245573, titled "Object Matching for Tracking, Indexing, and Search." Video analytics 120 include an object detection module 210 for detecting objects appearing in the field of view of camera 110. The input to object detection module 210 is preferably the live first set of image data from imager 115 or the video buffer memory (not shown). Object detection module 210 may employ any known object detection method such as motion detection or blob detection. Object detection module 210 may include the systems and use the detection methods described in commonly owned U.S. Pat. No. 7,627,171, titled "Methods and Systems for Detecting Objects of Interest in Spatio-Temporal Signals."

Video analytics 120 include an object tracking module 220 connected to object detection module 210. Object tracking module 220 is operable to temporally associate instances of an object detected by object detection module 210. Tracking may be thought of as locating an object in each video frame, and establishing correspondences between the moving object across frames. In general, the object tracking module 206 may use object motion between frames as a cue to tracking, while also relying on the object's appearance in the frames. Object tracking module 220 is operable to estimate changes of location of an object between sequential frames. Object tracking module 220 predicts the location and size of an object in a new frame based upon its previously estimated trajectory and velocity. In one example, object tracking module 220 uses a Kalman filter to predict the position and velocity of an object. Object tracking module 220 is capable of tracking multiple objects individually that are present in the scene at the same time.

Appearance-based tracking adds the ability to track a particular object in the field of view where many objects are present. Appearance-based tracking is enabled by a match classifier 225 that compares signatures corresponding to features of two objects in different video frames to determine whether the two objects are the same object. The features of the signatures are derived from the first set of image data produced by imager 115 and correspond to the objects' appearance characteristics in the frames of video information. The features may include aspect ratio, hue, intensity, edge orientations, texture, corner features, raw image pixel data, normalized saturation, and localized descriptors such as scale-invariant feature transformation (SIFT) features.

In one embodiment, match classifier 225 receives an input pattern that represents combinations of corresponding features from the two objects. Corresponding features from the two objects are combined using a distance measure selected from a library of distance measures (e.g., $L_1$ distance, Manhattan distance, $L_2$ distance, Bhattacharyya distance). Match classifier 225 selects certain ones of the combined features and transforms them to scalar values using one or more discriminant functions (e.g., a radial basis function, a sigmoid function) selected from a library. The scalar values produced by the transformations are weighted and summed to produce a decision step value that corresponds to a match confidence level representing how confident the decision step is that two objects in different frames correspond to the same object. In a preferred embodiment, match classifier 225 is trainable to determine which features, distance measures, and discriminant functions enable the most accurate and quickest match classification (e.g., match, non-match).

Using match classifier 225 for tracking enables accurate tracking even when some occlusion is present, motion is somewhat erratic, and a fair number of crisscrossing objects are present in the field of view of camera 110.

Video analytics 120 include a temporal object classification module 230 that is operable to classify an object according to its type (e.g., human, vehicle, animal, an object of interest) by considering the object's appearance over time. In other words, object tracking module 220 tracks an object for multiple frames (i.e., multiple images), and temporal object classification module 230 determines the object's type based upon its appearance in the multiple frames. Temporal object classification module 230 may combine information regarding the trajectory of an object (e.g., whether the trajectory is smooth or chaotic, whether the object is moving or motionless) and the confidence of classifications made by an object classification module 240 averaged over multiple frames when classifying the object. For example, classification confidence values determined by object classification module 240 may be adjusted based on the smoothness of trajectory of the object. Temporal object classification module 230 may assign an object to an unknown class until the object is classified by object classification module 240 a sufficient number of times and a predetermined number of statistics have been gathered. In classifying an object, temporal object classification module 230 may also take into account how long the object has been in the field of view. Temporal object classification module 230 may also use a hysteresis approach for changing the class of an object. For example, a threshold is set for transitioning the classification of an object from unknown to a human, and that threshold may be larger than a threshold for the opposite transition (i.e., from a human to unknown).

Video analytics 120 include object classification module 240 connected to object detection module 210. In contrast to temporal object classification module 230, object classification module 240 determines an object's type based upon a single instance (i.e., single image) of the object. In a preferred embodiment, the object classification module 240 includes the systems and use the methods described in commonly owned U.S. Patent Application Publication No. 2009/0244291, titled "Dynamic Object Classification." Object classification module 240 includes a number of object classifiers that correspond to different types of objects (e.g., full-human body classifier, human torso classifier, vehicle classifier, general object of interest classifier). The object classifiers receive appearance characteristic information corresponding to objects in the field of view and determine whether the objects belong to a particular class. Similar to match classifier 225, the object classifiers are preferably trainable to determine which features and transformations enable the most accurate and quickest object classification. Object classification module 240 also provides a classification confidence level in conjunction with an object's classification type.

Video analytics 120 also include an object indexing module 250 connected to a data storage system 255 for storing image data and other information. Object indexing module 250 is operable to generate metadata corresponding to signatures for different objects tracked by object tracking module 220. The signatures are stored in data storage system 255 and act as index elements that enable retrieval of video clips of the objects.

Video analytics 120 include an object search module 260 connected to data storage system 255 and a user station 265. Object search module 260 is operable to search through metadata signatures or index elements stored in data storage system 255 to identify whether an object was present in previously captured images. The signatures or index elements stored in data storage system 255 facilitate searching a large database of objects quickly for a specific object because actual pixel information from video images does not need to be reprocessed. In one embodiment, object search module 260 uses match classifier 225 to search for a specific object. Match classifier 225, together with the signatures of objects, enable object-based searches in both historical video and real-time video feeds.

Video analytics 120 include an object categorization module 270 connected to object classification module 240. Object categorization module 270 is operable to prioritize tracking when multiple objects are detected in an image. For example, object categorization module 270 is operable to use classification information generated by object classification module 240 to establish an order for attempting to associate objects of a current frame with objects detected in past frames. For example, tracking humans may be more important than tracking vehicles. In this example, object categorization module 270 establishes an order in which human objects detected in a current frame are associated with human objects of past frames before vehicle objects of the current and past frames are associated.

The various modules of video analytics 120 generate metadata based on the first set of image data and the analysis each module performs. The metadata represent various types of information about an object of interest detected in the field of view of camera 110. For example, the metadata represent the class of the object (e.g., whether the object is a human or vehicle), the confidence level of the classification, the signature of the object (e.g., appearance characteristics of the object), a unique identifier label for the object, a colored bounding box that surrounds and is superimposed over the image of the object, location and tracking information of the object (e.g., the location and size of the object, the size of the bounding box surrounding the object), motion (velocity, trajectory information), time duration that the object was in the scene, and a confidence level of an object match between frames of video.

Location information of the metadata corresponds to the location and size of an image of the object in a video frame captured by camera 110. In one example, the location information corresponds to the X-Y coordinates of an upper left corner and the lower right corner of the bounding box that encompasses the image of the object. In another example, the location information corresponds to the X-Y coordinates of a center of the image of the object and a radius that forms a circle that encompasses the image of the object. The metadata may also include a unique identifier label for each object of interest tracked by object tracking module 220 so that each object can be tracked and viewed separately on a display 280 if desired. The metadata, including the location information and the tracking information, are synchronized, frame by frame, to each image represented in the image data produced by imager 115. Preferably, the metadata are transmitted to data storage system 255 so the metadata can be accessed for subsequent processing. Metadata generated by video analytics 120 are used by a rules engine 290 to determine whether or not one or more user-specified rules have been violated. For example, rules engine 290 may trigger an alarm that alerts a user when a human is detected in the field of view of camera 110. Various different rules can be created by a user. For example, a user can create a rule that triggers an alarm when an object enters a specified region of interest (e.g., a fenced-in area) in the scene or when a certain type of object is present in the scene for more than a selected amount of time. Moreover, when rules engine 290 determines that a rule has been violated, rule violation information is included in the metadata and associated with the object that violated the rule. The rule violation information includes, for example, the type of rule violated. The rule violation information allows a user to search through the metadata based on types of rule violations.

System 100 also includes user station 265 depicted in FIG. 1. User station 265 includes a display system 310 including display 280 and an associated video adapter (e.g., a graphics accelerator) (not shown) for presenting to a user images captured by camera 110. User station 265 also includes a computer 320 connected to display system 310. Part of display system 310 may reside on a processor of computer 320. Computer 320 is connected to the other components of system 100 over network 117. User station 265 includes an input device 330 such as one or both of a keyboard and a computer mouse to enable the user to interact with system 100. Although one user station 265 is depicted in FIG. 1, system 100 may include multiple user stations 265 viewing video feeds from the same or different cameras 110. User station 265 may implement browser based video viewing of images captured by camera 110. In one example, user station 265 may be embodied in a cellular telephone, such as a smartphone.

System 100 includes data storage system 255 for storing image data and metadata created by system 100. Data storage system 255 may reside in housing 125 of camera 110, may be external to camera 110, or may be distributed in which part of the storage resides in housing 125 and part is external to camera 110. One example of a suitable data storage system is described U.S. Patent Application Publication No. 2009/0216939. Data storage system 255 includes one or more storage devices such as mass storage units (e.g., a hard drives), non-volatile memory, and volatile memory. In one embodiment, multiple cameras each include their own storage device and communicate with one another via network 117 so that data (e.g., image data, metadata) produced by one camera can be stored on the storage device of another camera. Moreover, the multiple cameras may communicate with one or more storage servers of data storage system 255 over network 117 so that data can be stored at a location remote from the cameras.

II. Display Management Module

System 100 also includes a display management module 340 that works in conjunction with video analytics 120 to provide an automatic, zoomed-in tracking window (e.g., a viewing window) that displays cropped close-up images of objects of interest as they move across the field of view of camera 110. The first set of image data supplied to video analytics 120 and to display management module 340 is preferably high resolution (e.g., megapixel resolution) image data so that the zoomed-in tracking window produces high quality close-up images that are helpful for the user.

When an object of interest is present in the scene, video analytics 120 send to display management module 340 the metadata corresponding to location information of the object of interest. Display management module 340 also receives the first set of high resolution image data produced by imager 115. The first set of image data may be sent to display management module 340 from video analytics 120, imager 115, or data storage system 255. The metadata sent from video analytics 120 are synchronized, frame by frame, to the first set of image data to enable display management module 340 to generate a video display window that zooms in on and tracks the object as it moves through the scene captured by camera 110.

Display management module 340 uses the synchronized metadata to locate in the first set of image data a subset of image data representing an image of the object (i.e., a zoomed-out image of the object). Display management module 340 then derives from the subset of data a second set of image data that represents a cropped close-up image of the object. The cropped close-up image of the object may be low resolution compared to the zoomed-out image of the scene. However, because the image captured by imager 115 is preferably a megapixel image, there is typically a relatively large amount of pixel information to zoom into. In one example, imager 115 includes more pixels than display 280 and, thus, some of the pixel information of the first set of image data is discarded when displaying a zoomed-out image of the scene. Using the metadata, display management module 340 locates a subset of the first set of image data corresponding to an area including an image of the object and crops out the remaining portions of the first set of image data so that more pixel information of the object is represented in the cropped close-up image than is represented in the zoomed-out image of the scene. By utilizing more pixel information for the cropped close-up image, the display management module 340 creates the effect of zooming in on the object. Moreover, display management module 340 may scale up or down (e.g., scaled up by 4× or less) the cropped close-up image of the object to fit the size of the zoomed-in tracking window.

Preferably, the zoom-in feature of display management module 340 is performed gradually when video analytics 120 detect an object of interest. For example, display management module 340 zooms in gradually during a 1 second period when video analytics 120 first detect an object of interest. Moreover, if video analytics 120 no longer detect the object of interest, display management module 340 may delay for a time period (e.g., about 1 second) before zooming out gradually for another time period (e.g., about 2 seconds). The delay and gradual zoom out may be implemented in anticipation that video analytics 120 may quickly redetect the object of interest or the object of interest may quickly reappear in the image of the scene.

Display management module 340 may wait until the object of interest violates a rule of rules engine 290 before generating the cropped close-up image. In one example, video analytics 120 wait to send the metadata to display management module 340 until rules engine 290 signals that the object of interest has violated a rule. In another example, the rules engine 290 communicates with the display management module 340 to indicate when a rule is violated. In another example, rule violation information is contained in the metadata supplied to the display management module 340, and the display management module 340 decides whether to generate the cropped close-up image based on the rule violation information. For example, the user may define that display management module 340 is to generate cropped close-up images for selected rule violations. The user may be interested in zooming in only on people, or only on vehicles. In another example, video analytics 120 recognize and display management module 340 generates cropped close-up images only of people who enter a region of interest, or a user configurable region of attention, in the scene during a selected time period (e.g., after work hours). Video analytics 120 keep track of those people even if they go outside the region of interest and display management module 340 continues to generate cropped close-up images of those people. In another example, video analytics 120 generate one or both of a detection confidence level and a classification confidence level, and the user can limit display management module 340 to create cropped close-up images only of objects whose detection and/or classification confidence level is above a selected threshold.

Through user configurable rules, the user may also set display priorities. For example, the user may rank portions of the first set of image data in order of importance. The user may give high priority to objects in a certain region of the scene so that display management module 340 generates cropped close-up images of objects in that region of the scene before doing so for objects in other regions. In one example, if an object is in that region, display management module 340 creates cropped close-up views of that object while ignoring objects in other regions. In another example, the user may rank people higher than vehicles, or vehicles higher than people. High priority settings may be used to direct display management module 340 how far to zoom in and which objects to follow when multiple things are happening at once in the scene.

Preferably, video analytics 120 are high quality to enable the user to control generation of cropped close-up images. For example, video analytics 120 can ignore background motion, recognize object types (e.g., people, vehicles, watercraft), and track objects by motion and also appearance. With these capabilities, video analytics 120 can track, and display management module 340 can zoom in on, one particular object in the scene while ignoring other objects. For example, if three people are walking in the scene but only one of them is of interest to the user, the user can select an image of the person of interest using input device 330. Video analytics 120 automatically track the person of interest and generate metadata (e.g., location information, unique identifier label) corresponding to the person of interest. High quality video analytics 120 enable tracking of the person of interest even when the person walks behind or in front of another person or object. The content of the metadata allows the display management module 340 to generate cropped close-up images that follow the person of interest while ignoring the other people. Video analytics 120 can also accurately recognize what people look like and can distinguish them from animals, vehicles, or other objects, which enables display management module 340 to automatically zoom in on a particular type of object while ignoring other types of objects.

User station 265 allows the user to manually intervene (e.g., by selecting via input device 330 control icons presented on display 280) to engage or disengage automatic tracking and automatic zoom of video analytics 120 and display management module 340. For example, automatic tracking and zoom may be engaged, and a user may disengage the automatic tracking and zoom to see the entire scene. The user can then select via input device 330 (e.g., by mouse movements) an area of the scene to zoom into. The coordinates of the selected area are communicated to display management module 340, and display management module creates cropped close-up images of the selected area. Other methods for manual zoom may be used. For example, graphical buttons (e.g., "zoom-in," "zoom-out," and "home" buttons) may be provided on display 280 for user selection and various mouse click and movement gestures (e.g., double click zoom, single click centering of a zoomed image, dragging the zoomed image, mouse wheel zoom-in and zoom-out) may be used to manually control cropped close-up images generated by display management module 340. Manual intervention may be useful when the user wants to zoom in on a license plate of a vehicle or a face of a person. The first set of image data representing zoomed-out images of the scene may be retained in data storage system 255 to allow the user to review (e.g., play back) video and zoom in on different parts of the scene captured at different times.

Figure 3:
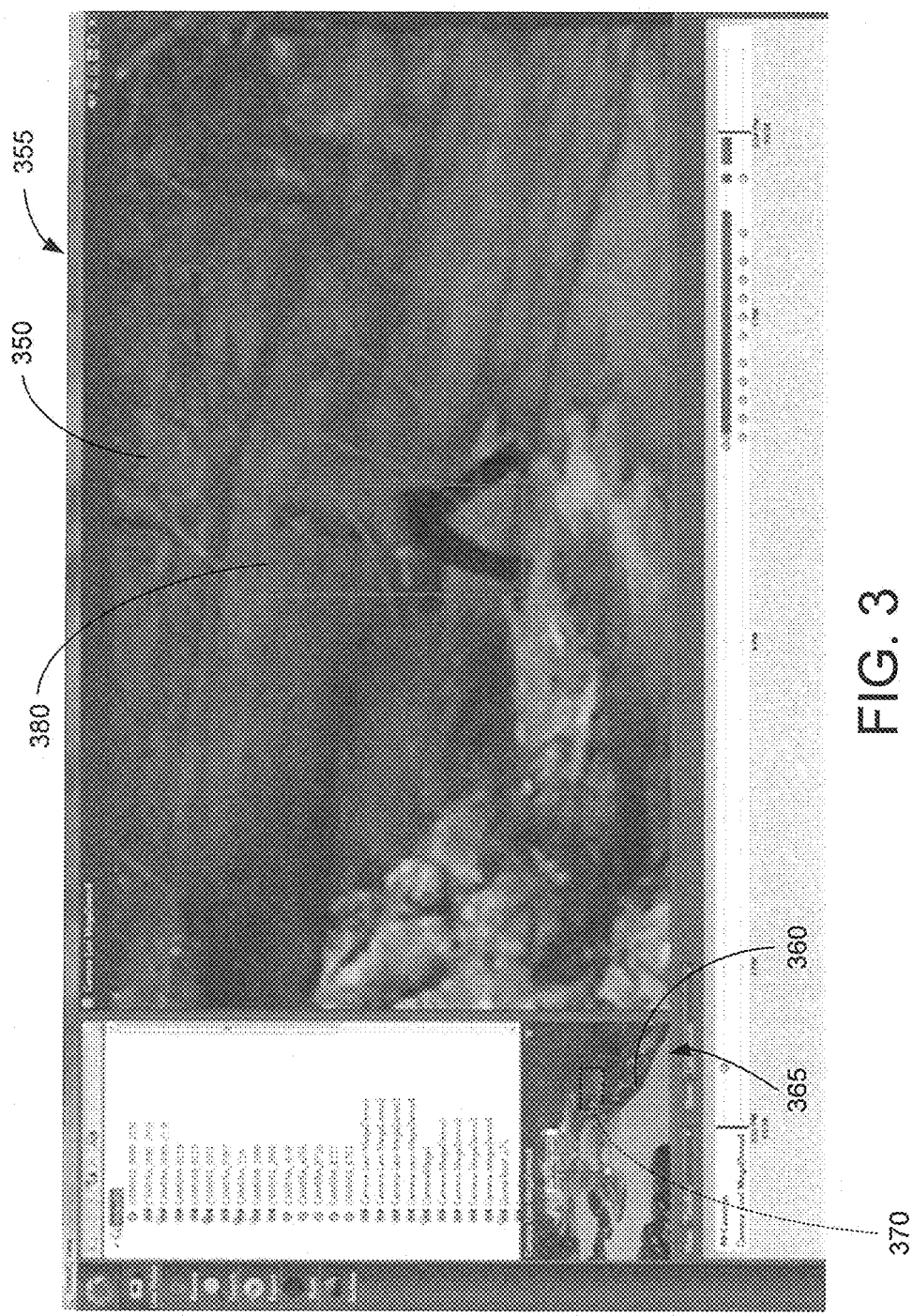
FIG. 3 is a photographic representation of a screen shot showing a zoomed-in tracking window and a zoomed-out viewing window generated by the camera system of FIG. 1.

Preferably the first set of image data produced by imager 115 is retained in data storage system 255 even though cropped close-up images are generated by display management module 340. In one example, the first set of image data produced by imager 115 and the second set of image data representing the cropped close-up images are supplied to display 280 so that the zoomed-out images of the scene and the cropped close-up images are simultaneously displayed in separate viewing windows. FIG. 3 is screen shot representation of display 280 in which a cropped close-up image 350 of a person walking through a scene is presented in a zoomed-in tracking window 355 and a zoomed-out image 360 of the scene is presented in a separate scene viewing window 365. A dashed outline box 370 is superimposed over image 360 to indicate a region of the scene from which cropped-close up image 350 is derived. As the person enters the scene and video analytics 120 detect and track the person, display management module 340 automatically creates cropped close-up images, such as image 350. Also, a colored bounding box 380 may be generated and superimposed over the image of the person when video analytics 120 detect and track the person. As the person moves through the scene, the cropped-close up images presented in zoomed-in tracking window 355 automatically track the movement of the person. Moreover, dashed outline box 370 moves relative to scene viewing window 365 in unison with movement of the person. Preferably, zoomed-in tracking window 355 is larger than scene viewing window 365 when both windows are presented on display 280. However, scene viewing window 365 may be the same size as or larger than zoomed-in tracking window 355.

Display management module 340 may generate one or both of cropped close-up video images of an object of interest and a cropped close-up snapshot image of the object of interest. Preferably, display management module 340 generates cropped close-up video images and snapshots are extracted from the video images and stored in data storage system 255. In one example, display management module 340 generates a cropped close-up snapshot image of an object corresponding to a moment in time when the object of interest first violates a rule (e.g., triggers an alarm). For example, if a person enters a region of interest, display management module 340 generates a cropped close-up image of the person corresponding to the moment when video analytics 120 first detect that the person entered the region of interest. In another example, display management module 340 generates cropped close-up video images of an object of interest, and video analytics 120 select certain ones of the video images to store in data storage system 255. Specifically, video analytics 120 recognize good clear images of objects or features of objects and can tag those images so that corresponding cropped close-ups of those clear images are saved as snapshots. Video analytics 120 use various image clarity measures to determine clear images. For example, video analytics 120 may use edge sharpness measures, focus sensing techniques, angle of an object or feature (e.g., angle of face or license plate), noise measurements, or color histograms to determine image clarity. In one example, video analytics 120 can recognize the relationship between a person's eyes to detect a good front facing view of the person's face. In another example, video analytics 120 can recognize the rectangular shape of a license plate to detect a good straight-on view of the license plate. In another example, video analytics 120 can use classification confidence generated by object classification module 240 to identify a snapshot of the object that looks most like other members of its class. Snapshots can be used for thumbnail displays of a graphical timeline of the scene, or in site dashboards that give a quick overview of activity in the scene. Moreover, these snapshots can be used in emails or other electronic communications sent for alarm situations. For example, snapshots may be transmitted to a cellular phone (e.g., a smartphone) and displayed on a screen of the cellular phone.

a. System Configurations

FIGS. 4-6 are pictorial diagrams of various configurations of system 100. In FIG. 4, video analytics 120 are contained in or form part of housing 125 of camera 110, while display management module 340 and a storage device 390 of data storage system 255 are remote from camera 110. For example, display management module 340 may reside on a processor of a remote server or on a processor of computer 320 of user station 265. Display management module 340 communicates with camera 110 over network 117 shown in FIG. 1. Alternatively or in addition to storage device 390, data storage system 255 may include a storage device 395 contained in or forming part of housing 125 in which image data and metadata produced by system 100 are stored.

The first set of image data (corresponding to data lines 400) produced by imager 115 and representing full resolution images of the scene, is sent to video analytics 120. The first set of image data may also be supplied from camera 110 to storage device 390 via network 117. Although FIG. 4 shows that video analytics 120 supply the first set of image data to storage device 390, the first set of image data may be supplied from imager 115 to storage device 390 without first passing through video analytics 120. In one example, the first set of image data is compressed using a known video compression technique before being stored in storage device 390. Preferably, when camera 110 contains storage such as storage device 395, the first set of image data is modified before being stored in storage device 395 to save storage space. For example, the first set of image data is modified in one or more of the following ways: (1) the image data is compressed; (2) the number of frames represented in the first set of image data is reduced (e.g., reduced from 30 frames per second to 10 frames per second or lower); and (3) the high resolution pixel information represented in the first set of image data is reduced to represent lower resolution zoomed-out images of the scene.

Video analytics 120 analyze the image data of the first set to perform one or more of object detection, tracking, and classification described above. In one example, display management module 340 also includes video analytic capabilities and produces corresponding metadata. In this example, video analytics 120 are operable to perform some of the video analysis, such as basic object detection, and display management module 340 is operable to perform some of the video analysis, such as object classification and rule violation detection. The remaining description of the configuration of FIG. 4 corresponds to an arrangement in which video analytics 120 perform the video analysis corresponding to one or more of object detection, tracking, classification, and rule violation detection.

In response to the analysis, video analytics 120 produce the metadata (corresponding to data lines 410) that are synchronized to each image (e.g., video frame) represented in the first set of image data. Camera 110 sends via network 117 the first set of image data and at least some of the metadata (e.g., location information, object identifier labels, rule violation information) produced by video analytics 120 to display management module 340. The first set of image data may be compressed before it is sent to display management module 340. In one example, the first set of image data and the metadata are streamed to display management module 340 in one data stream that includes an image data track containing video frames and a metadata track containing metadata frames. Camera 110 may include a device to capture audio information (e.g., a microphone), and the data stream may also include an audio track including audio packets produced by camera 110. In another example, the first set of image data and the metadata are streamed to display management module in separate data streams. Preferably, camera 110 also sends via network 117 the metadata to storage device 390 for storage therein.

From the first set of image data, display management module 340 derives the second set of image data (corresponding to data lines 420) representing cropped close-up images of objects. Specifically, display management module 340 uses the location information of the metadata to digitally crop and zoom in on objects of interest represented in the first set of image data. The second set of image data is communicated to display system 310 to create on display 280 cropped close-up images, such as cropped close-up image 350 of FIG. 3. Moreover, the second set of image data may be communicated to storage device 390. The second set of image data may be compressed before it is sent to storage device 390. In one example, user station 265 accesses the second set of image data from storage device 390 to present stored cropped close-up images on display 280. However, the second set of image data need not be stored. The first set of image data may also be communicated from display management module 340 to display system 310 to present on display 280 zoomed-out images of the scene, such as image 360 of FIG. 3. Alternatively, the first set of image data may be communicated directly from camera 110 to display system 310 over network 117 shown in FIG. 1 without passing through display management module 340. In another example, user station 265 may access the first set of image data stored in storage device 390 to present zoomed-out images of the scene on display 280. In another alternative example, the first set of image data 340 is not sent to display system 310 and only the cropped close-up images are sent to display system 310 for presentation on display 280.

The cropped close-up images produced by display management module 340, and enabled by video analytics 120, can track and match, frame by frame, the moving locations of the objects of interest so that the objects of interest are centered in the cropped close-up images. Accordingly, display management module 340 operates to create the impression that camera 110 is panning, tilting, and zooming to track the moving objects of interest. However, camera 110 preferably remains stationary. Moreover, the first set of image data produced by imager 115 is recorded in storage device 390 so that zoomed-out images of the scene can later be accessed and presented on display 280. Therefore, site awareness remains intact even when display management module 340 creates the cropped close-up images. Retaining the first set of image data allows video analytics 120 to detect multiple objects of interest as they enter the scene. Also, when the first set of image data is retained, the cropped close-up images generated by display management module 340 need not be stored in order for the user to review the cropped close-up images. Rather, the first set of image data can be communicated again to display management module 340, together with the stored metadata or metadata recreated by video analytics 120, to regenerate the cropped close-up images.

FIG. 5 is an alternative configuration of system 100. In FIG. 5, video analytics 120, display management module 340, and storage device 390 are at one or more locations remote from camera 110. Video analytics 120, display management module 340, and storage device 390 may be at the same or different locations. In one example, video analytics 120 and display management module 340 reside on a processor of computer 320 of user station 265. In another example, video analytics 120 reside on a processor of a remote server and display management module 340 resides on a processor of computer 320. In another example, video analytics 120 and display management module 340 reside on a processor of a server remote from user station 265. In the configuration of FIG. 5, camera 110 communicates with video analytics 120 over network 117 shown in FIG. 1. Moreover, camera 110 may communicate with one or more of display management module 340, user station 265, and storage device 390 over network 117, and video analytics 120, display management module 340, user station 265, and storage device 390 may communicate with one another over network 117.

The first set of image data (corresponding to data lines 400) produced by imager 115 is communicated to video analytics 120. The first set of image data represents high resolution, high frame rate zoomed-out images of the scene. Preferably, the first set of image data is compressed before it is sent from camera 110 to video analytics 120. Video analytics 120 receive and analyze the first set of image data to produce the metadata (corresponding to data lines 410). At least some of the metadata (e.g., location information, object identifier labels, rule violation information) and the first set of image data are communicated to display management module 340, which uses the metadata and the first set of image data to produce the second set of image data (corresponding to data lines 420) representing the cropped close-up images. The first set of image data and the metadata may be communicated to display management module 340 in the same or different data streams. The two sets of image data and the metadata may also be stored in storage device 390. Preferably, at least the first set of image data and the metadata are stored in storage device 390. The first set of image data may be communicated to storage device 390 from camera 110, from video analytics 120, or from display management module 340. The first set of image data stored in storage device 390 may be compressed image data. For example, the first set of image data may be compressed before being sent from camera 110 to storage device 390, or before being stored in storage device 390 (e.g., the first set of image data is compressed at storage device 390).

One or both of the first and second sets of image data are communicated to display system 310 so that one or both of the zoomed-out images of the scene and the cropped close-up images can be presented on display 280. In one example, the first set of image data is communicated from camera 110 to display system 310 to enable the user to view zoomed-out images of the scene. In other embodiments, the first set of image data may be communicated to display system 310 from video analytics 120 or display management module 340. User station 265 may also access one or more of the first and second sets of image data from data storage system 390 to display stored images.

In the configurations of FIGS. 4 and 5, system 100 can include multiple user stations 265, each with its own associated display management module 340. In one example, each display management module 340 receives the first set of image data and the metadata. However, users at different user stations 265 can independently zoom in on different parts of the zoomed-out images represented in the first set of image data without interfering with one another. For example, if two objects of interest appear in the scene at the same time, a first user at a first user station can select a first one of the objects to track and zoom in on while a second user at a second user station can select the second object to track and zoom in on. Specifically, display management module 340 associated with the first user station uses the metadata associated with first object to generate cropped close-up images of the first object, and display management module 340 associated with the second user station uses the metadata associated with the second object to generate cropped close-up images of the second object.

FIG. 6 shows an alternative configuration of system 100. In FIG. 6, video analytics 120, storage device 395, and display management module 340 are contained in or form part of housing 125 of camera 110. The first set of image data (corresponding to data lines 400) produced by imager 115 is sent to video analytics 120. The first set of image data may also be supplied to storage device 395. Preferably, the first set of image data is compressed before being supplied to storage device 395. Moreover, one or more of the frame rate and resolution of the first set of image data may be lowered before the first set of image data is stored in storage device 395. Video analytics 120 receive and analyze the first set of image data to produce the metadata (corresponding to data lines 410). At least some of the metadata (e.g., location information, object identifier labels, rule violation information) and the first set of image data are communicated to display management module 340, which uses the metadata and the first set of image data to produce the second set of image data (corresponding to data lines 420) representing the cropped close-up images. Preferably, the metadata and the second set of image data are also stored in storage device 395. For example, the second set of image data is stored in storage device 395 to enable the user to later access and play back the cropped close-up images.

The second set of image data may represent low resolution images compared to the zoomed-out images represented in the first set of image data. One or both sets of image data are communicated from camera 110 to user station 265 over network 117 shown in FIG. 1. For example, one or more of the first and second sets of image data may be communicated from camera 110 as a live video feed of the scene, or one or more of the first and second sets of image data may be communicated from storage device 395 so the user can review archived video. The first set of image data may be communicated to user station 265 from imager 115, video analytics 120, display management module 340, or storage device 395. The second set of image data may be communicated to user station 265 from display management module 340 or storage device 395.

When both the first and second sets of image data are communicated to user station 265, the first and second sets of image data may be transmitted in two separate data streams or in a single data stream having a first track for the first set of image data and a second track for the second set of image data. In one example, only the second set of image data is streamed over network 117 to user station 265, which may reduce bandwidth loads of network 117. However, the first set of image data is retained in storage device 395 if desired for later viewing. The significant bandwidth savings gained by storing the first set of image data in camera 110 allows megapixel cameras to be effectively used across limited bandwidth networks (e.g., cellular wireless networks). In other words, by generating cropped close-up images of important events or object of interest, display management module 340 provides spatial compression of video information for system 100, and it provides a useful way of displaying images of the scene by helping the user to focus on the events or objects of interest. Although the first set of image data need not be sent to display system 310, the user can request that the first set of image be sent in place of or in conjunction with the second set of image data for live viewing of the zoomed-out images of the scene. Additionally, when the first set of image data is streamed to user station 265, a relatively low frame rate (e.g., 3-5 frames per second) may be used for the first set of image data.

b. Group Zoom, Specific Object Zoom, and Feature Zoom

When multiple objects of interest are in the scene at the same time, display management module 340 can create cropped close-up images in which each image contains all or a selected number of the objects of interest. Moreover, display management module 340 can create cropped close up images of one of the objects of interest or multiple cropped close-up images at the same time in which each image corresponds to a different object of interest.

Figure 7:
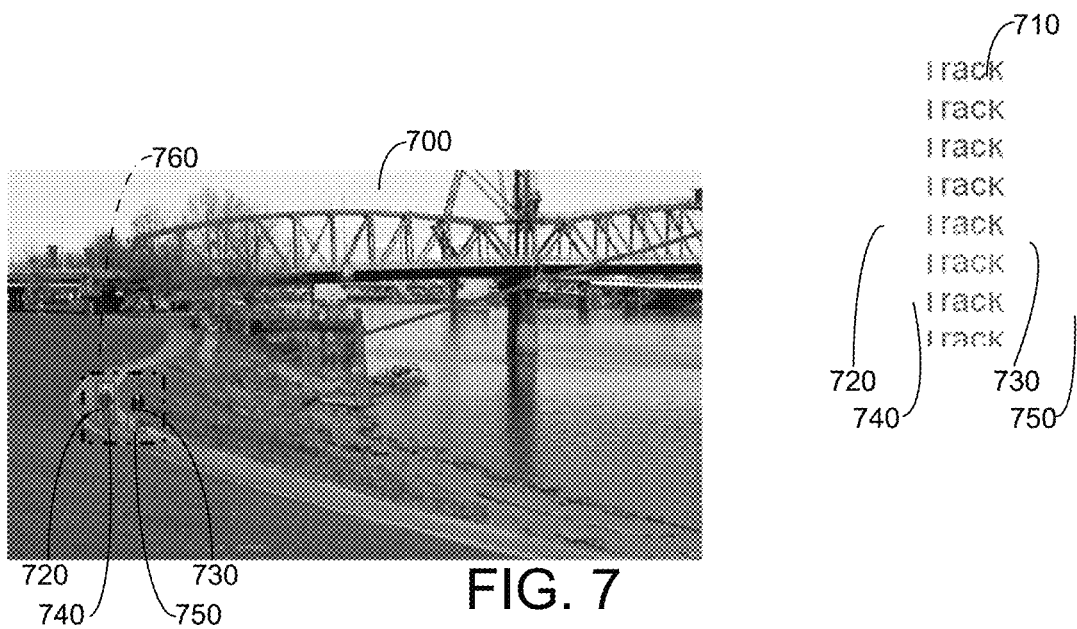
FIG. 7 includes photographic images corresponding to a zoomed-out image of a scene and a cropped close-up image generated from the zoomed-out image to demonstrate a group zoom capability of the camera system of FIG. 1.

The user may select (e.g., via input device 330) when to implement group zoom in which one cropped close-up image contains multiple objects and specific object zoom in which one cropped close-up image centers on one object. When group zoom is selected, display management module 340 extracts from the metadata the location information of multiple objects of interest represented in an image and uses that location information to create a cropped close-up image that includes the multiple objects of interest. FIG. 7 includes two photographic images 700 and 710 that demonstrate the group zoom capability of display management module 340. Image 700 is an example of a zoomed-out image of a scene represented in the first set of image data produced by imager 115, and image 710 is an example of a cropped close-up image generated by display management module 340. Image 700 contains representations of a first object 720 (a first person) and a second object 730 (a second person) captured in the scene. Video analytics 120 detect first object 720 and second object 730 and recognize them as objects of interest. Video analytics 120 may also recognize objects 720 and 730 as humans and generate corresponding object classification metadata. When video analytics 120 detect first and second objects 720 and 730, video analytics 120 generate bounding boxes 740 and 750 surrounding, respectively, first object 720 and second object 730. Bounding boxes 740 and 750 correspond to location information of first and second objects 720 and 730. Video analytics 120 generate other forms of metadata for each object 720 and 730 such as, identifier labels, type of object, and rule violation information, and video analytics 120 associate the metadata with image data representing the corresponding object 720 or 730.

The metadata and the image data representing image 700 are sent to display management module 340, and display management module 340 uses the metadata and the image data to generate image 710. For example, display management module 340 identifies the X-Y coordinate information of bounding boxes 740 and 750 and calculates an area 760 of image 700 that includes both bounding boxes 740 and 750 and, thus, both objects 720 and 730. In one example, display management module 340 provides extra space (i.e., padding) around bounding boxes 740 and 750. In one example, the total horizontal padding is equal to about 20% (e.g., 10% to the left side of bounding box 740 and 10% to the right side of bounding box 750) of the width from the left most side of bounding box 740 to the right most side of bounding box 750, and the total vertical padding is equal to about 10% (e.g., 5% above the top side of bounding box 740 and 5% below the bottom side of bounding box 750) of height from the bottom side of bounding box 750 to the top side of bounding box 740.

Figure 8:
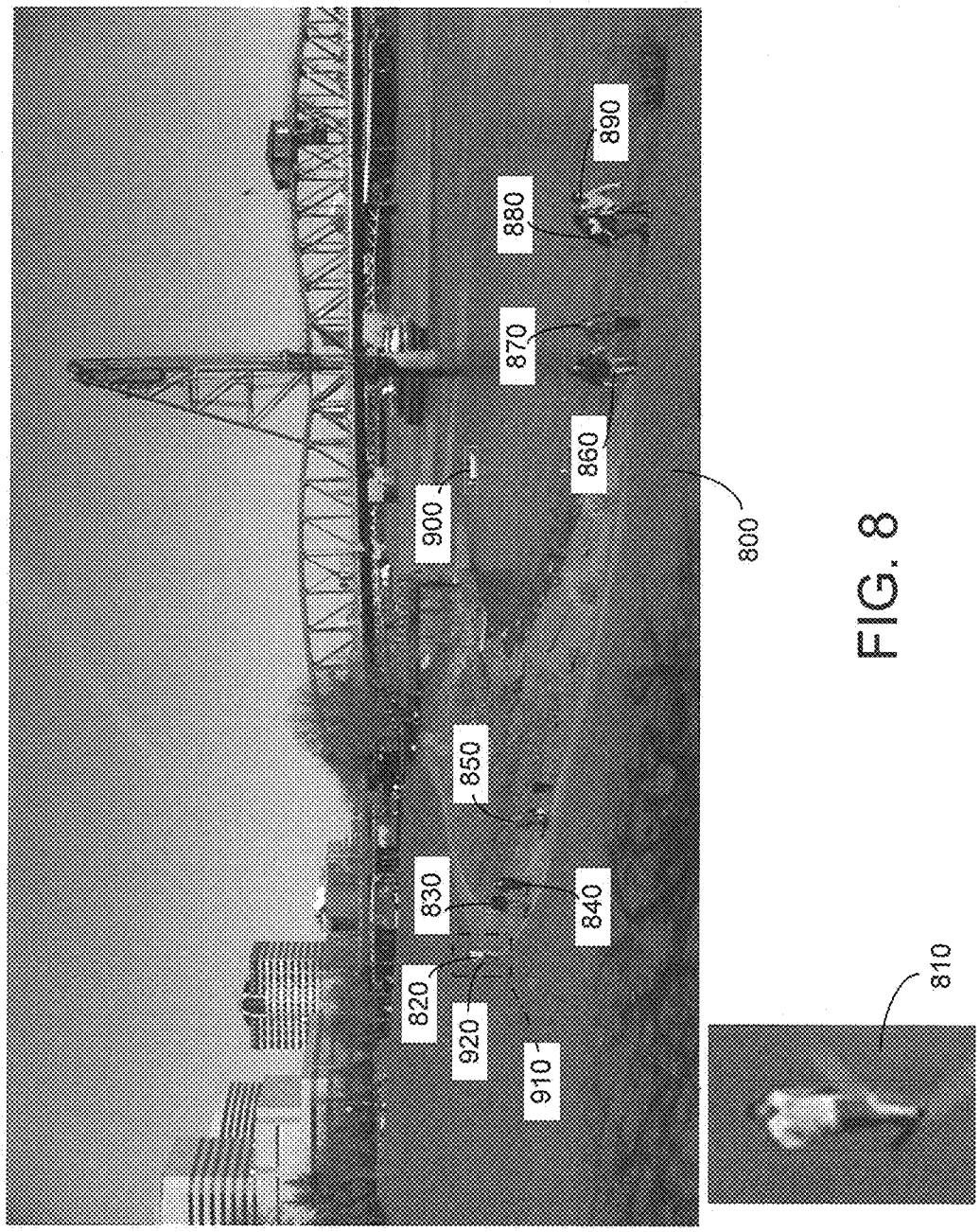
FIG. 8 includes photographic images corresponding to a zoomed-out image of a scene and a cropped close-up image of one of multiple objects in the scene to demonstrate a specific object zoom capability of the camera system of FIG. 1.

FIG. 8 includes photographic images 800 and 810 demonstrating one implementation of specific object zoom of display management module 340. Image 800, which represents a zoomed-out image of the scene, includes multiple objects of interest 820, 830, 840, 850, 860, 870, 880, 890 and 900 detected by video analytics 120. However, a user may be interested in zooming in on only object 820. Accordingly, the user selects object 820 (e.g., by using the mouse of input device 330 to hover a cursor over or near the image of object 820 and click on the image), which signals to display management module 340 to generate cropped close-up images that are localized to object 820 as it moves through the scene. Display management module 340 then calculates an area 910 of image 800 that is localized to and encompasses a bounding box 920 of object 820. Area 910 includes horizontal padding and vertical padding around bounding box 920. The horizontal and vertical padding used for cropped close-up images of a single object may be greater than that used for group zoom. For example, the total horizontal padding may be equal to about 100% (e.g., 50% on both the left and right sides of bounding box 920) of the width of bounding box 810, and the total vertical padding may be equal to about 100% (e.g., 50% above and below bounding box 920) of the height of bounding box 810. Zoomed-in tracking of object 820 may terminate in various ways. For example, zoomed-in tracking of object 820 may end when any one of the following occur: (1) the user clicks on image 800 far enough outside bounding box 920; (2) object 820 leaves the field of view or the identifier label of object 820 changes; (3) the user clicks on a graphical button that terminates zoomed-in tracking mode; and (4) the user closes the camera by closing in a browser image 800.

The user need not manually select object 820 in order for display management module 340 to generate cropped close-up images of only object 820. Rather, user control settings may indicate that display management module 340 is to generate cropped close-up images only of objects that violate a certain rule. In the example of FIG. 8, object 820 may be the only object in the scene that has violated a selected rule (e.g., a rule that ignores people walking and triggers for people who run or jog). Accordingly, display management module 340 generates cropped close-up images, such as image 810, of object 820 while ignoring the other objects 830-900.

In another embodiment of the specific object zoom functionality, display management module 340 generates multiple separate zoomed-in tracking windows, one for each object 820-900, similar to the way in which image 810 is generated for object 820. The cropped close-up images of the objects 820-900 may be stored in data storage system 255 together with the first set of image data from which the cropped close-up images are derived.

Figure 9:
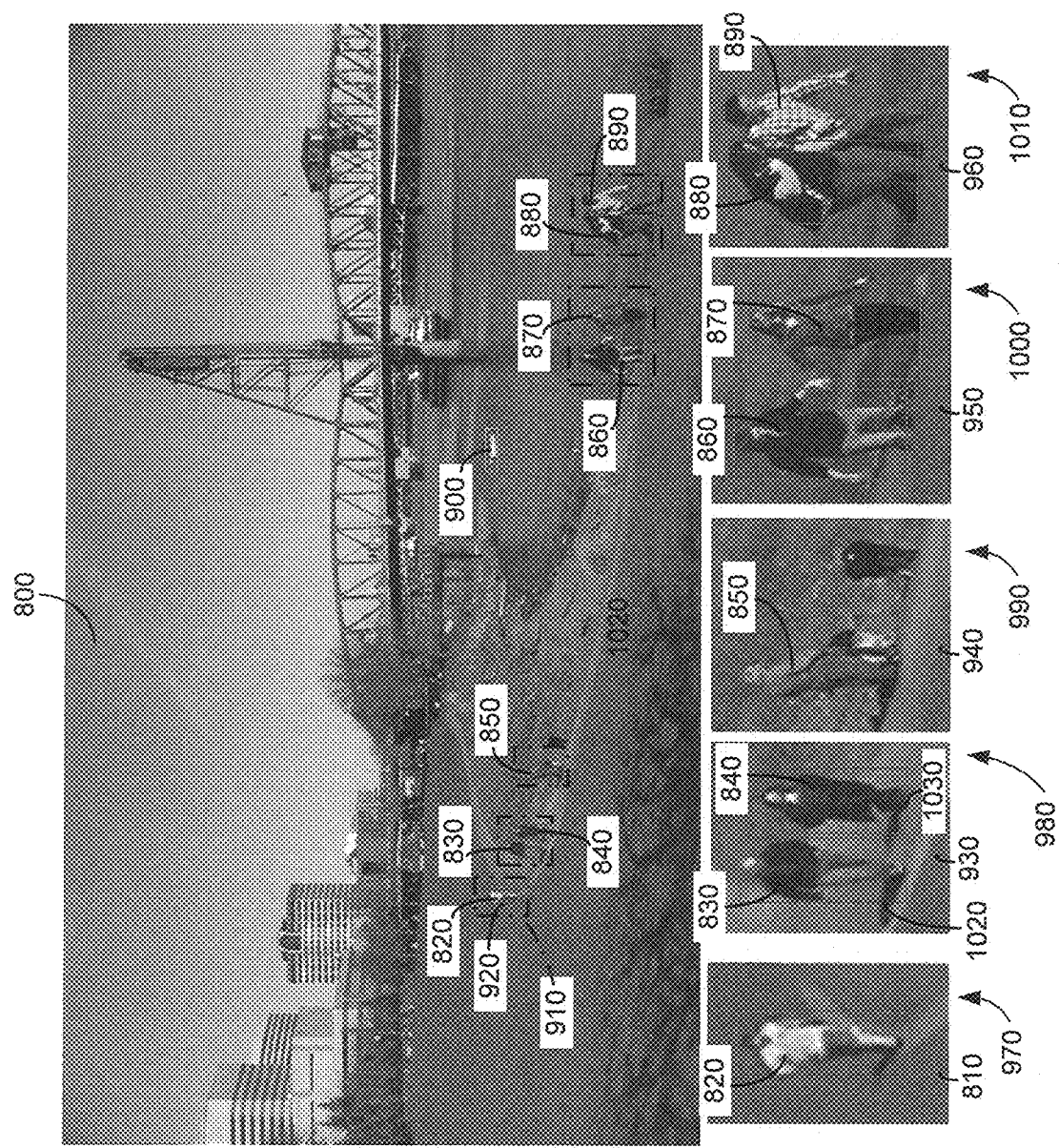
FIG. 9 includes photographic images corresponding to a zoomed-out image of a scene and multiple cropped-close up images of different objects in the scene to demonstrate a multiple zoomed-in window capability of the camera system of FIG. 1.

FIG. 9 includes images 800 and 810 and additional photographic images 930, 940, 950, and 960 to demonstrate a combination of specific object zoom and group zoom that may be implemented by display management module 340. Display management module 340 automatically generates multiple zoomed-in tracking windows 970, 980, 990, 1000, and 1010 for various ones of objects 820-900. In the example shown in FIG. 9, object 900 is ignored by display management module 340. For example, a user may select to zoom in only on humans. Video analytics 120 generate classification metadata identifying objects 820-890 as humans and object 900 as a non-human (or perhaps as a vehicle or as a watercraft). As shown in FIG. 9, some zoomed-in tracking windows include an image of one object (e.g., windows 970 and 990) while others include multiple objects (e.g., windows 980, 1000, and 1010). Multiple objects may be included in one viewing window when the objects are within a selected distance from one another. For example, display management module 340 may automatically generate window 980 for objects 830 and 840 when bounding boxes 1020 and 1030 touch or are within a selected number of pixels from each other. If objects 830 and 840 later move away from each other so that bounding boxes 1020 and 1030 no longer touch or are more than a selected number of pixels away from each other, display management module 340 may automatically split window 980 into two separate zoomed-in tracking windows. Moreover, if object 810 moves sufficiently close to objects 830 and 840, display management module 340 may automatically collapse windows 970 and 980 together so that all three objects 810, 830, and 840 are contained in one zoomed-in tracking window. In another example, display management module 340 automatically generates window 980 for objects 830 and 840 when video analytics 120 detect that objects 830 and 840 are moving together as a group and splits window 980 into two separate windows when objects 830 and 840 diverge in their paths or rates of walking.

The image data generated by display management module 340 and associated with zoomed-in tracking windows 970-1010 are preferably stored in data storage system 255. Storing the images associated with windows 970-1010 may take up far less storage space than storing the images of the scene represented in the first set of image data. For example, in FIG. 9, about 10% of the first set of image data is represented in the five zoomed-in tracking windows 970-1010, and yet windows 970-1010 contain most if not all of the important information. Additionally, zoomed-out images of the scene may be scaled down to lower resolution (e.g., scaled down to 10% of the original zoomed-out images) and used with cropped close-up images corresponding to windows 970-1010 to show the scene in perspective. Thus, in some circumstances, most of the important information corresponding to a scene may be represented by about 20% or less of the first set of image data (10% corresponding to the cropped close-up images and 10% corresponding to the scaled down zoomed-out images of the scene), and about 20% or less of the bandwidth of network 117 would be required to transmit the important information compared to transmitting the first set of image data.

Figure 10:
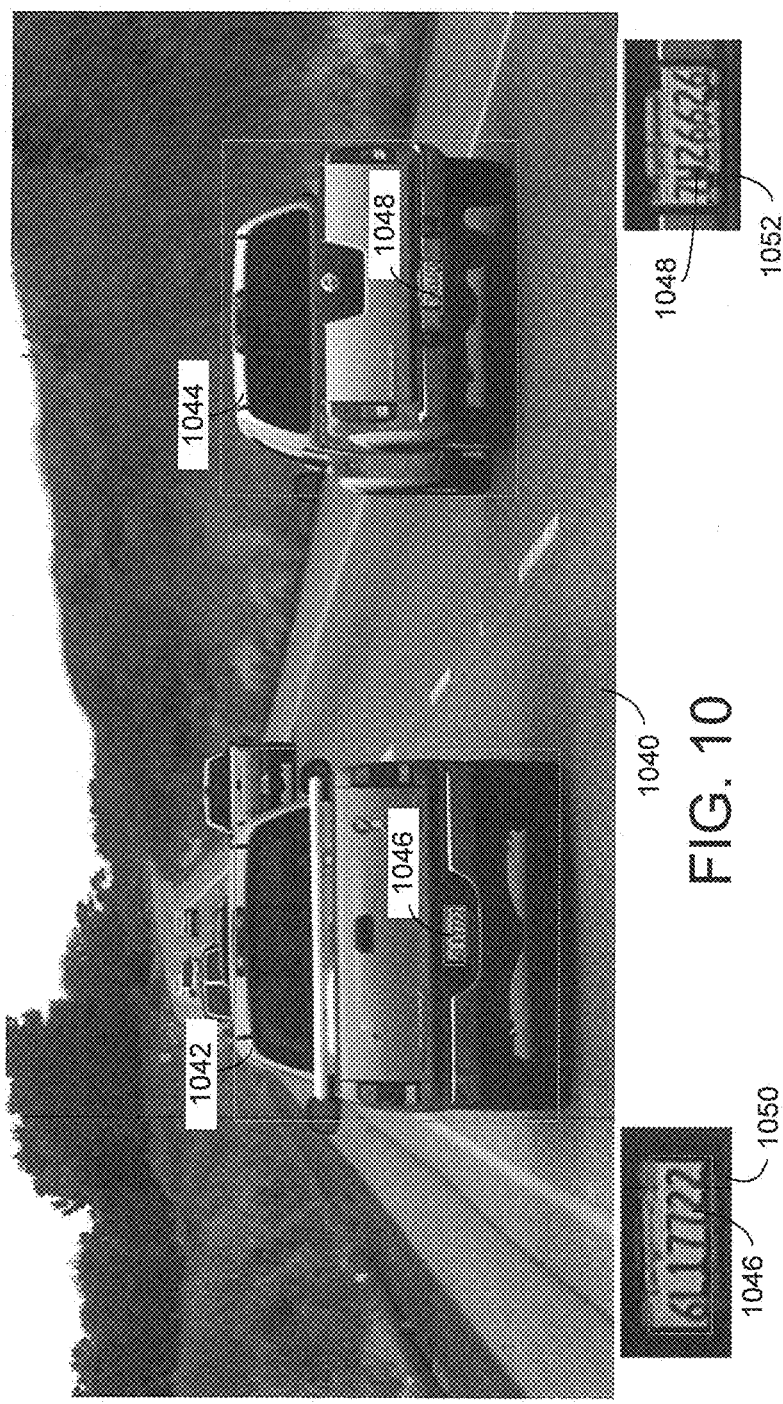
FIG. 10 includes a photographic image of two vehicles and two photographic images of the license plates of the vehicles to demonstrate a feature zoom capability of the camera system of FIG. 1.

In addition to creating cropped close-up images of objects, display management module 340 is capable of creating cropped close-up images of particular features of an object (e.g., a face or other identifying feature of a person, license plate of a vehicle). For example, FIG. 10 includes pictorial image 1040 showing two vehicles 1042 and 1044 traveling on a road. Video analytics 120 detect and classify license plates 1046 and 1048 of vehicles 1042 and 1044 and generate metadata (e.g., location information, classification). A vehicle may include additional identifying features such as lettering on the vehicle that may be detected by video analytics 120. Display management module 340 receives the metadata and image data corresponding to image 1040 and generates cropped close-up images 1050 and 1052 of license plates 1046 and 1048. Images 1040, 1050, and 1052 may be stored in data storage system 255. Cropped close-up images 1050 and 1052 may be sent to a license plate recognition system (not shown) connected to network 117 of FIG. 1. The license plate recognition system may reside at various locations of system 100 including, for example, user station 265, a remote server, and camera 110. Images 1050 and 1052 are presented on display 280 to help the user read the license plate numbers. System 100 may also include a facial recognition system to receive cropped close-up images of faces of people.

When video analytics 120 detect features of objects of interest, close-up images of those features may be presented to a user in different ways. For example, video analytics 120 recognize vehicle 1042 and license plate 1046 and generate metadata corresponding to vehicle 1042 and license plate 1046. Video analytics 120 may also recognize that license plate 1046 belongs to vehicle 1042 and generate metadata linking license plate 1046 to vehicle 1042. Display management module 340 may generate cropped close-up images of vehicle 1042 that are presented on display 280 in one zoomed-in tracking window and one or more cropped close-up images of license plate 1046 that are presented in a separate zoomed-in tracking window. In an alternative example, display management module 340 generates one or more cropped close-up images of license plate 1046 without generating cropped close-up images of vehicle 1042. In another example, display management module 340 generates a stream of video in which cropped close-up images of vehicle 1042 are presented in a zoomed-in tracking window for a period of time and cropped close-up images of license plate 1046 are presented in the zoomed-in tracking window for a second period of time. By doing so, display management module 340 creates the impression that camera 110 zooms in on vehicle 1042, then further zooms in on license plate 1046 for some time, and then pulls back to a zoomed-in view of the vehicle or to the full scene. Display management module 340 may generate zoomed-in video of object features or zoomed-in snapshots of object features.

c. Example Implementation of Display Management Module

Figure 11:
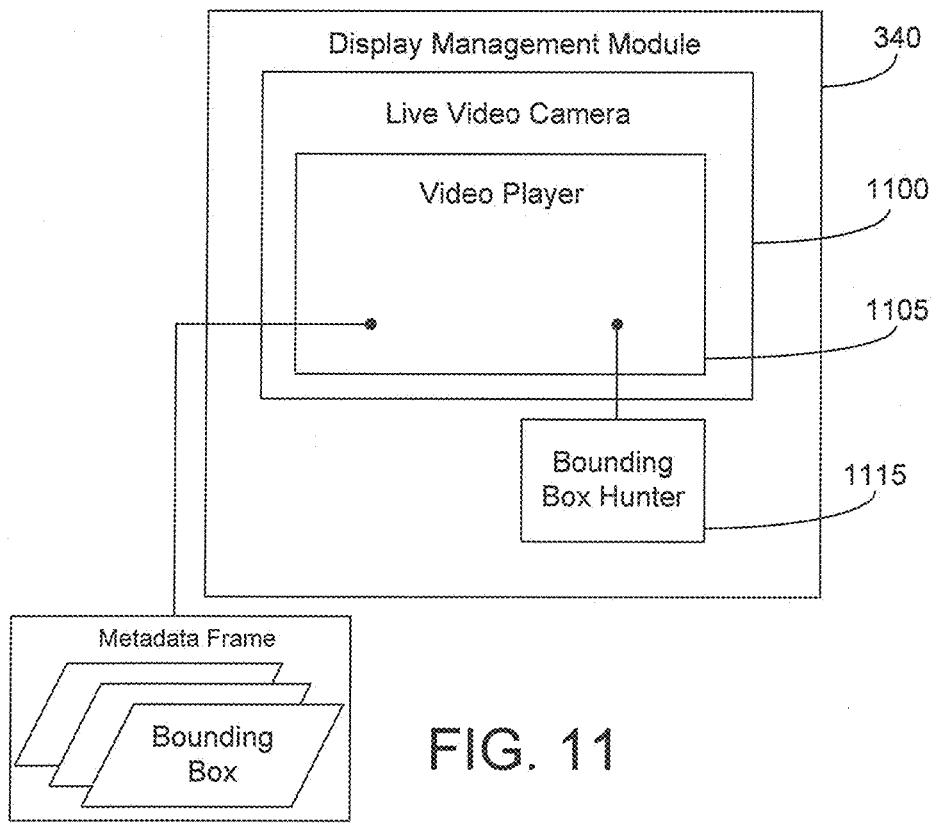
FIGS. 11 and 12 are block diagrams of components of one embodiment of a display management module of the camera system of FIG. 1.
Figure 12:
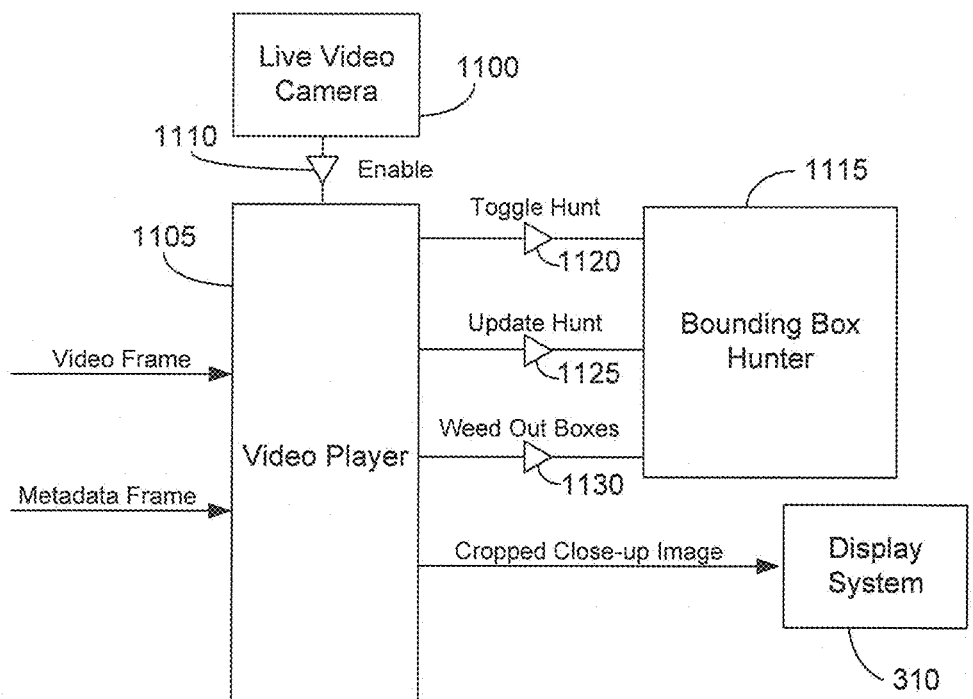

FIGS. 11 and 12 correspond to one example of a specific implementation that may be employed for display management module 340. However, other implementations may be employed for display management module 340. This implementation is particularly applicable to the system configurations shown in FIGS. 4 and 5 in which display management module 340 is remote from camera 110. Skilled persons will recognize various ways that this implementation can be adapted to conform to the system configuration shown in FIG. 6.

FIG. 11 is a block diagram of various components of display management module 340, and FIG. 12 is a block diagram of the components, together with data lines and control lines. Display management module 340 includes a live video camera object 1100 that represents camera 110. When display management module 340 communicates with multiple video cameras, display management module 340 includes a video camera object 1100 for each camera. Moreover, display management module 340 may receive recorded image data from data storage system 255 in place of or in addition to receiving image data from camera 110. When display management module receives recorded image data, display management module 340 includes a video control object (not shown), which is analogous to video camera object 1100, for the recorded image data. Accordingly, the following description of video camera object 1100 is also applicable to the video control object.

Video camera object 1100 may be a window-like object of one of various different types of graphical user interface platforms. Video camera object 1100 includes a video player object 1105 that receives a video frame represented in the first set of image data and a metadata frame corresponding to metadata that video analytics 120 derive from the video frame. Video player object 1105 controls the zooming level that is used for each cropped close-up image as well as the location and size of the area of the zoomed-out image from which the cropped close-up image is extracted. Video player object 1105 supplies the second set of image data representing the cropped close-up image to display system 310. Video camera object 1100 includes a control button 1110 that allows the user to enable and disable the functionality of video player object 1105 for camera 110.

The metadata frame received by video player object 1105 includes an array of information about detected objects. The metadata frame is formatted as an array of bounding box structures corresponding to the objects detected in the video frame. Each bounding box structure corresponds to an object and includes:

the object's type (e.g., human, vehicle, suspicious);
identifier label (e.g., an ID assigned to the object by video analytics 120, the identifier label persists between frames);
X and Y coordinates of the top-left corner of the bounding box surrounding the object; and
X and Y coordinates of the bottom-right corner of the bounding box.

Video player object 1105 includes the video area of the video frame. For example, the video area represents the total area of the image of the scene represented by the video frame. Video player object 1105 uses the information of a bounding box structure corresponding to an object and the video area to associate the location and size of the object with the video area.

Video player object 1105 is operable to generate a bounding box hunter object 1115 when a user desires to implement the specific object zoom feature of display management module 340 in which the user can select an object presented on display 280 to zoom in on. Bounding box hunter object 1115 is enabled and disabled by a user selectable button 1120. During generation of bounding box hunter object 1115, bounding box hunter object 1115 may receive an ID of camera 110 and store that ID. Bounding box hunter object 1115 receives the bounding box structures of the metadata frame and also the video area. Bounding box hunter object 1115 follows mouse movements of the user and acts when a cursor hovers over or passes close (e.g., within 50 pixels) to a bounding box of an object the user wishes to select. In one example, if a cursor is close (e.g., within 50 pixels) to two bounding boxes, a box whose center is closer to the cursor becomes eligible for selection. When the cursor hovers over or near the bounding box, bounding box hunter object 1115 may change the color of the bounding box (e.g., from red to orange) and may change the symbol associated with the cursor. When the user clicks in or near the bounding box, bounding box hunter object 1115 sends the ID corresponding to the selected bounding box to video player object 1105, which then starts tracking the object.

When a new video frame is displayed before the user selects an object, bounding box hunter object 1115 receives an update hunt function call 1125, which enables bounding box hunter object 1115 to receive a new metadata frame corresponding to the new video frame. Bounding box hunter object 1115 also receives a weed out boxes function call 1130 that ensure that bounding box hunter object 1115 ignores certain types of objects specified in user control settings. For example, the user may be interested in zooming in on humans but not vehicles. In that case, weed out boxes function call 1130 controls bounding box hunter object 1115 so that it ignores vehicles.

Video player object 1105 may also use bounding box hunter object 1115 to implement the group zoom functionality of display management module 340. When group zoom is selected by a user, bounding box hunter object 1115 returns to video player object 1105 bounding box locations and sizes in display screen coordinates. Video player object 1105 derives a crop rectangle for the group of bounding boxes. If the user desires to ignore certain objects (e.g., ignore vehicles, ignore objects that have not violated a certain rule), weed out boxes function call 1130 ensures that bounding box hunter object 1115 ignores those objects when returning the bounding box locations and sizes. Video player object 1105 is operable to compute coordinates for multiple crop rectangles when the user desires to see multiple zoomed-in tracking windows as shown in FIG. 9, for example. Video player object 1105 may also be operable to determine when to combine or split crop rectangles (e.g., when objects move close to one another or when objects move away from one another).

Video player object 1105 is operable to calculate crop rectangles based on the locations and sizes bounding boxes. Video player object 1105 is operable to ensure that the cropped close-up images presented on display 280: (1) include the corresponding object (or objects) and center it (or them) in the images, (2) change smoothly from frame to frame to avoid jittering of the video image, and (3) avoid excessive pixelation by limiting the scaling factor if needed. In one example, pixelation is measured as the maximum ratio of display height and image height, or display width and image width, in which a higher ratio indicates more redundancy in a displayed image. Determination as to whether pixelation is excessive may be subjective and based on experimentation.

To achieve smooth movements of an actual crop rectangle used for the cropped close-up images, video player object 1105 uses an ideal crop rectangle and a smoothing period to compute the actual crop rectangle. The ideal crop rectangle is computed as a rectangle that includes the selected object(s) plus padding on each side of the object(s) (e.g., 10-50% padding around the bounding box). If the resulting ideal crop rectangle would cause excessive pixelation, the ideal crop rectangle is increased in size to reduce the zooming factor. If needed, the ideal crop rectangle can be corrected to fit the frame or preserve the original aspect ratio. In one example, video player object 1105 implements a smoothing period of about 0.3 second except when (1) the prior frame has no tracked objects but the current frame has a tracked object, in which case the smoothing period is about 1 second; and (2) the prior frame has a tracked object but the current frame has none, in which case the smoothing period is 2 seconds long. Also, in scenario (2), the smoothing period may be delayed by 1 second in anticipation that a disappearing target may quickly reappear.

The ideal crop rectangle is a crop rectangle that should be reached at the end of the smoothing period. For each frame, however, video player object 1105 computes an actual crop rectangle that is used for creating the cropped close-up image. The actual crop rectangle is a linear transformation of the prior frame's actual crop rectangle. Moreover, because tracked objects are typically in a state of movement, the ideal crop rectangle is recalculated at each frame. In one example, the actual crop rectangle includes four coordinates: X coordinate of the top-left corner of the actual crop rectangle; the Y coordinate of the top-left corner of the actual crop rectangle; the X coordinate of the bottom-right corner of the actual crop rectangle; and the Y coordinate of the bottom-right corner of the actual crop rectangle. Preferably, the value for each coordinate of the actual crop rectangle for a frame is calculated using the following equation:

Actual Crop Value=Ideal Value−(Ideal Value−Prior Value)*Remaining Smoothing where Ideal Value is the value of the corresponding coordinate calculated for the ideal crop rectangle from the prior frame, Prior Value is the actual crop value calculated for the prior frame, and Remaining Smoothing is the amount of time remaining in the smoothing period. The Actual Crop Value for each coordinate is calculated and the crop rectangle corresponding to the coordinates is used to generate the cropped close-up image for the frame. After calculating the crop rectangle for the current frame, a new ideal crop rectangle is computed that will be used for the next frame. If the new ideal crop rectangle differs from the ideal crop rectangle of the prior frame, the smoothing period is reset.

III. Intelligent Video File Management System

Figure 13:
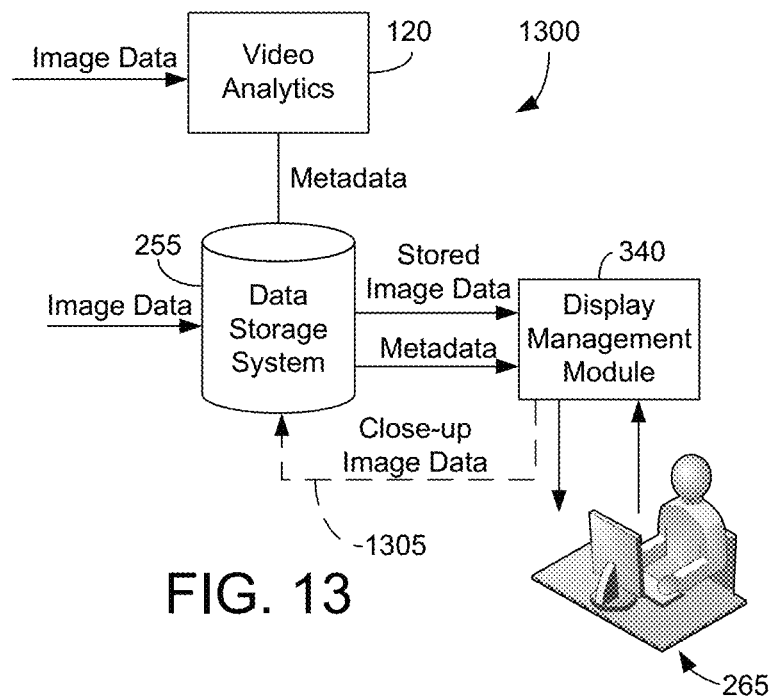
FIG. 13 is a pictorial block diagram of an intelligent video file management system according to one embodiment.

Video analytics 120 and display management module 340 may be used to provide time compressed representations of images of the scene to enable informative and fast comprehension of events and objects of interest. FIG. 13 is a pictorial block diagram of an intelligent video file management system 1300, according to one embodiment, in which video analytics 120 and display management module 340 are used in conjunction with data storage system 255 to provide intelligent fast video playback of video images stored in data storage system 255. As described in the previous sections, video analytics 120 receive image data produced by imager 115 representing multiple images of the scene. Video analytics 120 analyze the image data to detect, track, and classify objects of interest and produce synchronized metadata corresponding to the analysis. The metadata are transmitted to data storage system 255 for storage. Data storage system 255 also receives image data that may be the same as image data supplied to video analytics 120 or derived from the image data supplied to video analytics 120. For example, as described below, the image data from imager 115 may be compressed and then stored in data storage system 255. In another example represented by dashed line 1305, the image data stored in data storage system 255 for playback includes image data produced by display management module 340 that represents cropped close-up images of objects. The metadata are synchronized with the image data stored in data storage system 255 and provide links to the stored image data.

When the user desires to review images represented in the stored image data, user station 265 signals display management module 340 to retrieve stored image data 340. Data storage system 255 sends both the stored image data and the synchronized metadata to display management module 340, and display management module 340 controls playback speed of the stored image data. The control of the playback speed of the stored image data is dictated by the metadata. Specifically, during analysis of the image data produced by imager 115, video analytics 120 produce metadata corresponding to activity level information representing the importance of activities that occur in the scene captured by imager 115. The activity level information corresponds to the speed at which a particular frame or sequence of video is to be played back. The activity level information may include various levels of activity. In one example, two levels of activity are provided—one representing no events of interest occurred and the other representing an event of interest occurred. Accordingly, the two levels of activity would provide two playback speeds. In another example, video analytics 120 may generate four levels of activity corresponding to four different playback speeds. In another example, video analytics 120 may generate eight levels of activity corresponding to eight different playback speeds.

The activity level determined by video analytics 120 for a given image or sequence of video may be based on a number of different factors including, but not limited to, whether an object of interest is present in the scene, the number of objects in the scene, the class of the object, the speed of the object, the duration the object is present in the scene, rule violations associated with the object, and time of day when the image or video is captured. For example, if a fast moving object (e.g., a vehicle) is present in the scene for a relatively brief time, a high activity level is associated with the object indicating that video of the fast moving object should be played back at a relatively slow speed so the user does not miss the object during playback. By comparison, if a slow moving object (e.g., a person walking slowly) is in the scene for a relatively long period of time, a lower activity level is associated with the slow moving object indicating that video of that object should be played back at a relatively fast speed compared to video of the fast moving object. Additionally, if no objects are present in the scene, the lowest activity level may be associated with corresponding video indicating that the video should be played back at the fastest playback speed or skipped over altogether during playback.

In one example, the user may be interested in fast playback of a stream of video that includes segments of zoomed-out images of the scene and cropped close-up images of objects produced by display management module 340. In some embodiments, however, the cropped close-up images are lower resolution images than the zoomed-out images produced by imager 115. Accordingly, lower resolution zoomed-out images of the scene can be generated to match the resolution of the cropped close-up images. Those lower resolution zoomed-out images are stored in data storage system 255 with the cropped close-up images so that the stream of video includes the same resolution for the zoomed-out and cropped close-up images. Original higher resolution zoomed-out images of the scene may also be stored in data storage system 255 separate from the stream of video.

Figure 14:
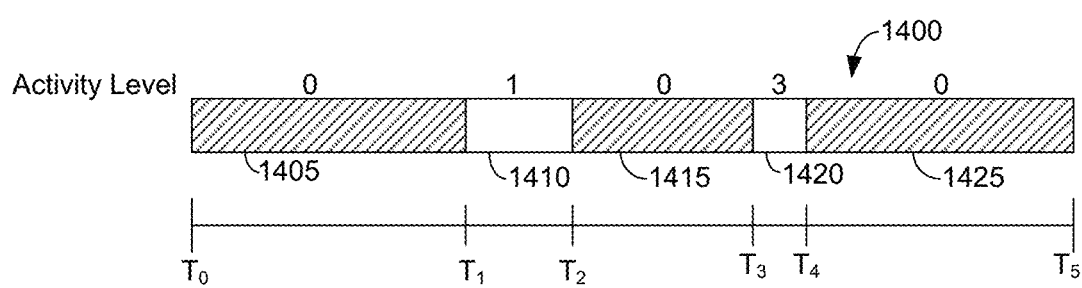
FIG. 14 is a timeline representation of image data stored in a data storage system of the intelligent video file management system of FIG. 13.

FIG. 14 is a time line representation of a video stream 1400 stored in data storage system 255. Video stream 1400 includes representation of five segments 1405, 1410, 1415, 1420, and 1425 of video. Segments 1405, 1415, and 1425 represent video captured by camera 110 during times when video analytics 120 detected no objects or events of interest in the scene. In other words, no important activities occurred between times $T_0$-$T_1$, $T_2$-$T_3$, and $T_4$-$T_5$. Segment 1410 represents video captured by camera 110 during times $T_1$-$T_2$ when video analytics 120 detected that a first event of interest occurred in the scene. Segment 1420 represents video captured by camera 110 during times $T_3$-$T_4$ when video analytics 120 detected that a second event of interest occurred in the scene. The metadata generated by video analytics 120 include activity level information that includes an activity level of 0 for segments 1405, 1415, and 1425 (indicated by the "0" above the segments), an activity level of 1 for segment 1410 (indicated by the "1" above segment 1410), and an activity level of 3 for segment 1420 (indicated by the "3" above the segments). Accordingly, during playback of video stream 1400, display management module 340 adaptively controls the speed of playback of the segments in which segments 1405, 1415, and 1425 are played back at a speed corresponding to activity level 0, segment 1410 is played back at a speed corresponding to activity level 1, and segment 1420 is played back at a speed corresponding to activity level 3. In one example, activity level 0 indicates that display management module 340 is to skip over the corresponding segment, activity level 1 indicates that display management module 340 is to implement a relatively fast event playback speed for segment 1410, and activity level 3 indicates that display management module 340 is to implement a relatively slow event playback speed for segment 1420. In one example, the relative slow playback speed of segment 1420 is faster than real time playback speed. Once an event of interest corresponding segment 1410 or 1420 is located, the user can slow the playback to a real time playback speed or even slower speeds (e.g., half real time speed, frame by frame playback)

Figure 15:
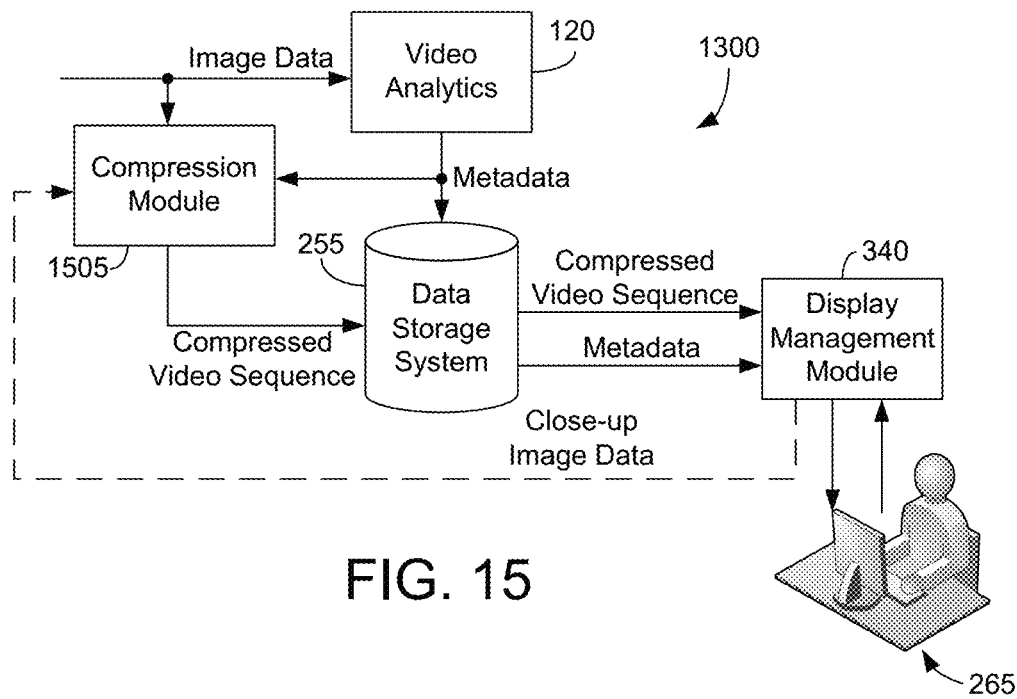
FIG. 15 is a pictorial block diagram of an intelligent video file management system according to another embodiment.

FIG. 15 is a block diagram of a intelligent video file management system 1500 according to another embodiment. In this embodiment, system 1500 includes an image data compression module 1505. This embodiment may be particularly applicable when video analytics 120 and compression module 1505 are contained in or form part of housing 125 of camera 110. Compression module 1505 receives the image data produced by imager 115 and the metadata produced by video analytics 120. Compression module 1505 may also receive image data produced by display management module 304 representing cropped close-up images of objects. Compression module 1505 generates a compressed video sequence representing a compressed version of the image data it receives. In one example, compression module 1505 is operable to generate low resolution zoomed-out images from the image data supplied from imager 115 to match the resolution of the cropped close-up images produced by display management module. Compression module 1505 is operable to generate a compressed video sequence including the low resolution zoomed out images and the cropped close-up images. The compressed video sequence is stored in data storage system 255. The original image data may also be stored in data storage system 255 to enable the user to playback the original video associated with the image data.

Figure 16:
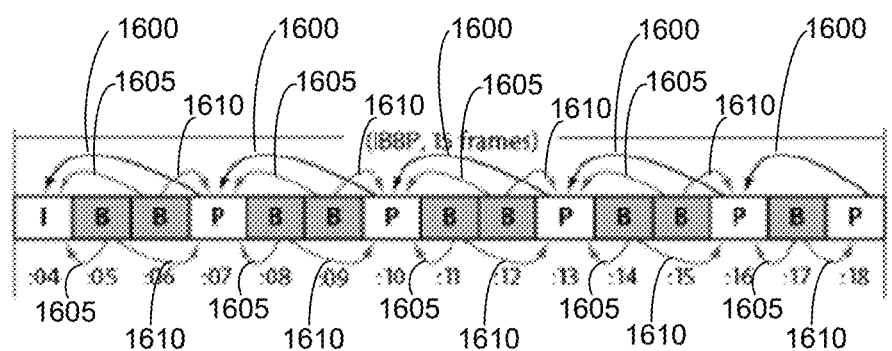
FIG. 16 is a timeline representation of a compressed stream of image data.

The compressed video sequence is generated without the need of post processing the original image data. The level of compression that compression module 1505 implements is based on the content of the image data as determined by video analytics 120. For example, the activity level information of the metadata is communicated to compression module 1505 to indicate what level of compression should be implemented for a given segment of the image data. The level of compression for a given segment of the image data effects the playback speed of the segment. Compression module 1505 uses an inter-frame compression technology, such as MPEG-2, MPEG-4, H.264, or other similar codecs. Inter-frame compression generally has a key frame, sometimes call an "I" frame, that is an independent frame as shown in FIG. 16. An "I" frame can be viewed on its own, like a JPEG image. Playback of video begins with an "I" frame, which provides a complete and accurate picture in one frame.

Following the "I" frame are predictive frames, called "P" frames, and in some cases, bi-directionally predictive frames, called "B" frames. A typical video sequence includes a series of "I" frames, "P" frames, and "B" frames such as shown in FIG. 16. Because "I" frames include complete and accurate picture information, "I" frames need not reference any other frames to display an image of the scene. "P" frames, on the other hand, capture only the changes in video since the previous frame, so they refer to the last "P" or "I" frame as a reference as represented by arrows 1600. To provide efficient compression, "B" frames combine both the changes since the last frame and the changes coming in the next frame. Thus, "B" frames refer to the last "P" or "I" frame as represented by arrows 1605, as well as the next "P" or "I" frame as represented by arrows 1610.

If a "P" frame becomes damaged during transmission or playback, the rest of the "B" and "P" frames that follow would also become corrupted. Thus, the video would deteriorate in quality or completely fall apart until the next "I" frame resets all the pixels. In this embodiment to intelligent fast video playback, the "I" frames are intelligently spaced apart, and the "I" frames are then used during playback. Specifically, the activity level information of the metadata generated by video analytics 120 is communicated to compression module 1505 and used to control the insertion of "I" frames in the video sequence. The number of "I" frames inserted for a given segment of the image data effects the speed at which the segment of image data is played back. In one example, an "I" frame is inserted when an object of interest is first detected to capture the start of a video sequence of the object. This "I" frame may be used as a snapshot described above. In systems that also use hierarchical "P" frames (e.g., "P" frames that contain more information that lower level "P" frames), "B" and "P" frames can be dropped and the hierarchical "P" frames can be used in conjunction with the "I" frames for intelligent fast playback. Using hierarchical "P" frames may help to improve compression efficiency.

In one example, if a car is moving rapidly through the scene, video analytics 120 assign an activity level to the corresponding segment of image data indicating compression module 1505 should use a relatively high number of "I" frames per second for the corresponding segment of the compressed video sequence. For example, with the rapid motion of the car, it may be desirable to insert two "I" frames per second to ensure that at least a few frames of the vehicle are displayed during fast playback before the vehicle leaves the field of view. In contrast, with relatively normal activity, such as cars parking or a few people moving around in the scene, one "I" frame per second may be used. In another example, if a person is walking slowly at a distance so that it takes 10 seconds or longer to cross the scene, compression module 1505 might insert only one "I" frame every two seconds. And during periods of time with no detected activity of importance, compression module 1505 may use one "I" frame every 8 seconds, or even less for the corresponding segment of the compressed video sequence. Inserting more "I" frames corresponding to moments when important activities occur may improve quality of the recorded video when it is most needed. In contrast, spacing the "I" frames out during periods of little or no activity may improve compression without sacrificing needed quality. Accordingly, a compressed video sequence may be produced that requires lower use of bandwidth and less storage space to record.

During fast playback, display management module 340 plays back the "I" frames. In one example, the image data produced by imager 115 may be originally recorded at 15 frames per second. However, playback of the compressed video sequence corresponding to normal or high activity may include playing only one or two frames per second, and playback of the compressed video corresponding to little or no activity may including playing only one frame from every two to eight seconds of the image data.

Playback control also includes the ability to play "I" frames at selected speeds. For example, the metadata produced by video analytics may include playback speed information that is used by display management module 340 to control the playback speed of the "I" frames of different segments of the compressed video sequence. For example, the playback speed information may instruct display management module 340 to play the "I" frames of segments with little to no activity at a fast speed, such as 15 frames per second, and to slow the playback down to less than 15 frames per second when display management module 340 arrives at a segment of the of the video sequence corresponding to an event of interest. When display management module 340 arrives at an important event, the user can switch over to regular playback mode in which all 15 frames per second as originally recorded are presented at regular speed so the user can see all the details captured.

The following example illustrates time savings that may be gained from intelligently spacing apart the "I" frames. Given a one-hour segment of video in which 90% of the segment (i.e., 54 minutes or 3240 seconds) corresponds to non-event time (i.e., time duration when nothing of interest occurs in a scene) and 10% of the segment (i.e., 6 minutes or 360 seconds) corresponds to event time (i.e., time duration when an event of interest occurs), display management module 340 inserts one "I" frame every 10 seconds for the non-event time and one "I" frame every second for the event time. In other words, the non-event time includes 324 "I" frames and the event time includes 360 "I" frames. If display management module 340 skips over the non-event time and plays back the event time at 10 "I" frames per second, the playback time of the one-hour segment of video is reduced to about 36 seconds. Alternatively, if display management module 340 plays back the non-event time and the event time at 10 "I" frames per second, the playback time of the one-hour segment of video is reduced to about 68 seconds. In other words, the playback time of 90% of the one-hour segment (i.e., the non-event time) is reduced by a factor of about 100 to about 32 seconds, and the playback time of 10% of the one-hour segment (i.e., the event time) is reduced by a factor of about 10 to about 36 seconds. In comparison, a conventional system with a 10× fast forward speed would take about 5-10 times as long to play back the one-hour segment compared to this illustrative example. Moreover, with a convention system, it would be easier for a user to miss the event of interest.

Display management module 340 may also reduce playback time by skipping through segments of the original image data in which nothing important was captured. The metadata generated by video analytics 120 may represent a frame by frame index of the activities detected. Thus, display management module 340 can scan through the metadata stored in data storage system 255 to identify segments of the original image data that have no important activity. The metadata stored in data storage system 255 retains links to the original image data and the compressed video sequence stored in data storage system 255. Therefore, display management module 340 can search through the metadata looking for criteria specified by the user to find video segments representing activities the user desires to review.

Fast playback may begin at different points in the compressed video sequence and may speed forward or reverse through the images. For example, the user may be interested in reviewing video of certain activities that occurred within the last hour. A query is sent to display management module 340 to retrieve from data storage system 255 video sequences corresponding to the last hour that meet the criteria selected by the user. Display management module 340 searches through the metadata in data storage system 255 to identify video segments having the metadata corresponding to the activities selected by the user. After the video segments are identified, display management module 340 receives the pertinent video segments from data storage system 255 and sorts them by time. Display management module 340 then creates a playlist in order of the time the video segments occurred. By retrieving only video segments corresponding to selected activities, the user can skip all the periods of time when nothing important took place, which can save considerable time reviewing video. To help the user gain a perspective of time during intelligent fast playback, a clock may be displayed showing the date and time of a corresponding displayed video sequence.

The user can configure a search to identify any number of different activities. The following is one example scenario in which the metadata can be searched by the user to identify a person who stole a computer from an office. In this example, no rules were preset on the camera watching a hallway by the office from which the computer was stolen. However, the user can configure the system 1500 to search only for people crossing into or out of the office doorway over the last few days. To do so, the user configures the search criteria to detect people crossing the office doorway by drawing a line on an image of the scene corresponding to the base of the door. The user can also set the criteria for direction of travel to detect only people crossing the line who are leaving the office. The user can then pick a point in time before the laptop was stolen and start the intelligent fast playback. Display management module 340 then creates a search query for people crossing the region of the doorway, defined by the line drawing, going out of the office. Display management module 340 searches the metadata in data storage system 255 and creates a playlist including video sequences returned from the search. During playback, display management module 340 jumps across any period of time that did not have a person leaving the office and plays the selected segments of interest at pre-assigned "I" frame rates. If the user spots something that looks like it might be a person leaving with a laptop, the user can slow down the frame rate, or switch over to regular playback, to watch the video at real time rates.

Figure 17:
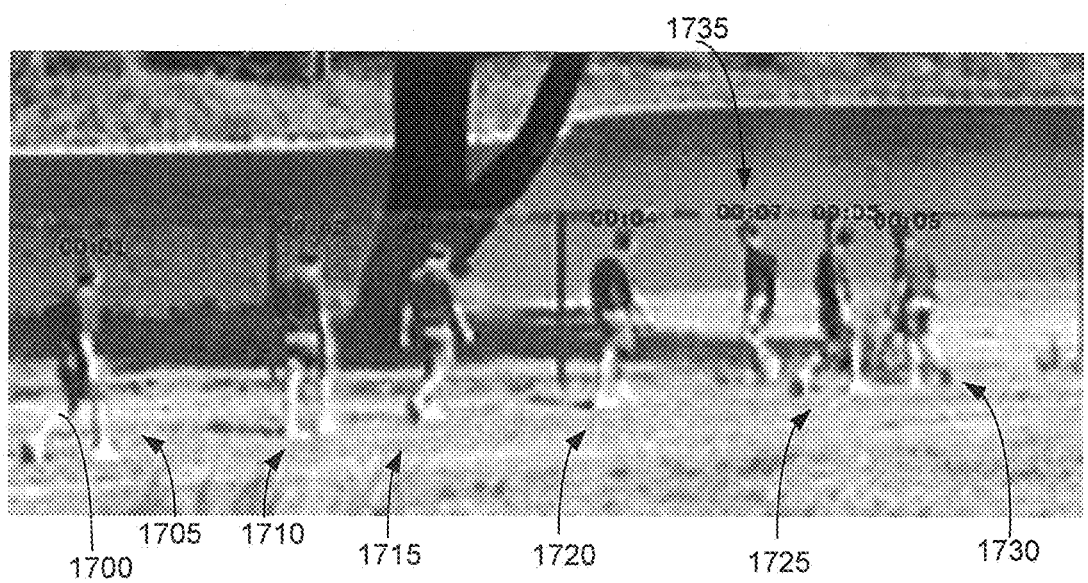
FIG. 17 is a photographic image representing a time capsule generated by the intelligent video file management system of FIG. 13 or FIG. 15.

In another example, system 1300 or 1500 is operable to generate a time capsule of an object of interest representing a single image with multiple views of the object of interest over a period of time. Time capsules provide another way of compressing time corresponding to video information. FIG. 17 is a photographic image of a scene representing a time capsule of an object 1700. Video analytics 120 detect object 1700 in the scene during a sequence of video. At selected periods of time during the sequence of video, display management module 340 extracts snapshot images 1705, 1710, 1715, 1720, 1725, 1730, and 1735 from the image data produced by imager 115. For example, one snapshot image of the object is extracted every second. Specifically, display management module 340 uses the metadata generated by video analytics 120 to locate the images of object 1700 in the sequence of video. Display management module 340 is operable to continue to extract snapshot images of object 1700 until a selected event transpires (e.g., object 1700 leaves the scene or crosses outside a region of interest, a selected time period elapses). After the selected event transpires, display management module 340 superimposes images 1705, 1710, 1715, 1720, 1725, 1730, and 1735 over a background image of the scene. Preferably, display management module 340 also produces a visible time stamp for each extracted snapshot corresponding to a time when the corresponding snapshot was captured by imager 115. For example, image 1705 includes a time stamp 00:01 above it indicating that image 1705 was captured within the first second of detection of object 1700. The time stamps create a time line so the user can understand the movement of object 1700 through the scene. Display management module 340 can generate other forms of time compression for video information. For example, display management module 340 can generate a graphical timeline for an object that includes one or both of associated time capsules and close-up snapshots. The user can move a cursor over a specific point in the time line to provide a pop-up view of the time capsule or snapshot corresponding to the specific point in time. The user can then click on the pop-up window to view an intelligent fast playback clip, a cropped close-up video clip, or the original video clip.

It will be obvious to skilled persons that many changes may be made to the details of the above-described embodiments without departing from the underlying principles of the invention. The scope of the present invention should, therefore, be determined only by the following claims.

The invention claimed is:

1. A video system for intelligent visual display of one or more objects of interest, comprising:
   a video camera having an imager that produces video representing a sequence of images of a scene within a field of view of the video camera;
   a video processor producing image data from the video;
   video analytics receiving and analyzing the image data to detect one or more objects of interest present in the scene, the video analytics generating, from the image data, video frame-specific metadata that include location metadata representing location information corresponding to locations of a plurality of images of the one or more objects of interest in the sequence of images of the scene and time metadata representing time information corresponding to when the images of the object of interest were captured by the imager;
   a display management module receiving the image data and the location metadata, and extracting a series of cropped close-up images of the one or more objects of interest from the image data until a selected event transpires, and displaying the series of cropped close-up images of the one or more objects of interest in one or more tracking windows at the same time with the sequence of images of the scene corresponding to a period of time from when the one or more objects of interest were detected until the selected event transpired, wherein the series of cropped close-up images are chosen by the video analytics from a plurality of possible images from the image data, and wherein each cropped close-up image among the series of cropped close-up images is associated with a visible time stamp corresponding to a time when each cropped close-up image was captured; and
   wherein the display management module is configured to, on selection of one of the cropped close-up images among the series of cropped close-up images, display a video clip of the one or more objects of interest comprising the selected cropped close-up image.

2. The video system of claim 1, further comprising a data storage system for storing the series of cropped close-up images to enable playback display presentation of the one or more tracking windows.

3. The video system of claim 2, in which the video frame-specific metadata are stored in the data storage system.

4. The video system of claim 2, in which the video camera includes a camera housing and the data storage system includes a storage device that is contained in or forms a part of the camera housing, the image data being stored in the storage device.

5. The video system of claim 1, in which the video camera includes a camera housing and the video analytics are contained in or form a part of the camera housing.

6. The video system of claim 5, in which the display management module is part of a processor that is remote from the video camera.

7. The video system of claim 6, in which the video camera includes a communication interface for transmitting to the display management module the image data and the video frame-specific metadata in a data stream, the data stream comprising a first track that includes the image data and a second track that includes the video frame-specific metadata.

8. The video system of claim 7, the display management module further synchronizing the location metadata and the timing metadata to the image data, and wherein the image data represents multiple video frames of the scene and the video frame-specific metadata include multiple location metadata frames representing location information corresponding to locations of images of the object of interest in the multiple video frames, each of the multiple location metadata frames corresponding and being synchronized to a distinct one of the multiple video frames.

9. The video system of claim 1, in which the video camera includes a camera housing and the video analytics and the display management module are each contained in or form a part of the camera housing.

10. The video system of claim 9, further comprising a display system, the video camera including a communication interface for transmitting to the display system the image data, the video camera transmitting to the display system the image data in a data stream.

11. The video system of claim 1, in which the video camera includes a camera housing and the video analytics are located remotely from the camera housing.

12. The video system of claim 1, in which the video camera includes a camera housing, and further comprising a data storage system for storing the image data, the data storage system located remotely from the camera housing.

13. The video system of claim 1, in which the object of interest present in the scene is stationary.

14. The video system of claim 1, further comprising a display system, and in which:
   the video camera includes a camera housing; and
   the display management module is located remotely from the camera housing and in network communication with the display system.

15. The video system of claim 14, in which the video analytics are contained in or form part of the camera housing.

16. The video system of claim 14, in which the video analytics are located remotely from the camera housing.

17. The video system of claim 1, in which:
the imager of the video camera produces, at a full resolution, video from which the image data is produced; and
the image data is generated at a resolution that is lower than the full resolution.

18. The video system of claim 1, wherein the selected event transpires when the object of interest leaves the scene.

19. The video system of claim 1, wherein the selected event transpires when the object of interest crosses outside of a region of interest and into another region within the scene.

20. The video system of claim 1, wherein the selected event transpires when a predetermined time period elapses.

21. The video system of claim 1, wherein two objects of interest among the one or more objects of interest are displayed in a single tracking window unless the two objects of interest are more than a selected pixel distance from one another in the scene whereupon each object of interest among the two objects of interest are displayed in different tracking windows.

22. The video system of claim 1, wherein two objects of interest among the one or more objects of interest are initially displayed in a single tracking window until the first object of interest moves a selected pixel distance from the second object of interest in the scene whereupon a first object of interest among the two objects of interest is displayed in a first tracking window and a second object of interest among the two objects of interest is displayed in a second tracking window.

23. The video system of claim 1, wherein the display management module automatically generates tracking windows for the one or more objects of interest.

24. The video system of claim 23, wherein at least some of the one or more objects of interest moving together as a group are displayed by the display management module in a single tracking window.

25. The video system of claim 23, wherein at least some of the one or more objects of interest moving on divergent paths or at different speeds are displayed by the display management module in different tracking windows.

26. A method for producing a tracking window depicting over time an object of interest captured by a video camera, comprising:
producing image data representing video images of a scene within a field of view of a video camera;
analyzing with use of video analytics that analyze the image data to detect an object of interest present in the scene, the video analytics generating, from the image data, video frame-specific metadata that include location metadata representing location information corresponding to locations of images of the object of interest in the video images of the scene and time metadata representing time information corresponding to when the images of the object of interest were captured by the video camera;
choosing a series of cropped close-up images of the object of interest from a plurality of possible images from the image data;
operating a display management module to extract from the image data the series of cropped close-up images of the object of interest until a selected event transpires;
in response to the selected event transpiring, operating the display management module to display the series of cropped close-up images of the object of interest in the tracking window at the same time with the video images of the scene from when the object of interest was detected until the selected event transpired, wherein each cropped close-up image among the series of cropped close-up images is associated with a visible time stamp corresponding to the time when each cropped close-up image was captured; and
in response to a selection of one of the cropped close-up images among the series of cropped close-up images, displaying a video clip of the object of interest comprising the selected cropped close-up image.

27. The method of claim 26, further comprising storing in a data storage system the series of cropped close-up images to enable playback display presentation of the tracking window.

28. The method of claim 27, further comprising storing the video frame-specific metadata in the data storage system.

29. The method of claim 26, in which a first image among the series of cropped close-up images corresponds to a cropped close-up image of the object of interest corresponding to an instance in time when the object of interest triggered an alarm.

30. The method of claim 26, in which the series of cropped close-up images of the object of interest include a cropped close-up image of a selected feature of the object of interest.

31. The method of claim 30, in which the object of interest is a human being and the selected feature corresponds to the face of the human being.

32. The method of claim 30, in which the object of interest is a vehicle and the selected feature is an identifying feature of the vehicle.

33. The video system of claim 30, in which the image data is generated at a first resolution and the cropped close-up image of the object of interest is presented for display at a second resolution that is higher than the first resolution.

34. The method of claim 26, in which the video camera includes a camera housing and the video analytics are contained in or form a part of the camera housing.

35. The method of claim 26, in which the video camera includes a camera housing and the video analytics are located remotely from the camera housing.

36. The method of claim 26, in which the video camera includes a camera housing, and further comprising a data storage system for storing the image data, the data storage system contained in or forming a part of the camera housing.

37. The method of claim 26, in which the video camera includes a camera housing, and further comprising a data storage system for storing the image data, the data storage system located remotely from the camera housing.

38. The method of claim 26, further comprising a display system, and in which:
the video camera includes a camera housing; and
the display management module is contained in or forms a part of the camera housing.

39. The method of claim 26, further comprising a display system, and in which:
the video camera includes a camera housing; and
the display management module is located remotely from the camera housing and in network communication with the display system.

40. The method of claim 26, in which the object of interest present in the scene is stationary.

41. The method of claim 26, wherein the selected event transpires when the object of interest leaves the scene.

42. The method of claim 26, wherein the selected event transpires when the object of interest crosses outside of a region of interest within the scene.

43. The method of claim 26, wherein the selected event transpires when a predetermined time period elapses.

44. The method of claim 26, wherein a second object of interest in the video images of the scene is detected and displayed in the tracking window unless the second object of interest is more than a selected pixel distance from the object of interest in the scene whereupon the second object of interest displayed in a second tracking window.

45. The method of claim 26, wherein a second object of interest in the video images is detected and displayed with the object of interest in a single tracking window and the object of interest is displayed in a first tracking window and the second object of interest is displayed in a second tracking window when the object of interest moves a selected pixel distance from the second object of interest in the scene.

46. The method of claim 26, wherein the display management module automatically generates tracking windows for each object of interest detected in the video images of the scene.

47. The method of claim 46, wherein at least some objects of interest moving together as a group are displayed by the display management module in a single tracking window.

48. The method of claim 46, wherein at least some objects of interest moving on divergent paths or at different speeds are displayed by the display management module in different tracking windows.

\* \* \* \* \*